(12) United States Patent
Sugiyama et al.

(10) Patent No.: US 11,073,179 B2
(45) Date of Patent: Jul. 27, 2021

(54) SLIDING-TYPE CONSTANT VELOCITY UNIVERSAL JOINT AND METHOD FOR MANUFACTURING SAME

(71) Applicant: NTN CORPORATION, Osaka (JP)

(72) Inventors: Tatsuro Sugiyama, Shizuoka (JP); Kazuhiro Azuma, Shizuoka (JP); Ritsuki Sakihara, Shizuoka (JP)

(73) Assignee: NTN CORPORATION, Osaka (JP)

( * ) Notice: Subject to any disclaimer, the term of this patent is extended or adjusted under 35 U.S.C. 154(b) by 364 days.

(21) Appl. No.: 16/099,514

(22) PCT Filed: Apr. 19, 2017

(86) PCT No.: PCT/JP2017/015743
§ 371 (c)(1),
(2) Date: Nov. 7, 2018

(87) PCT Pub. No.: WO2017/195552
PCT Pub. Date: Nov. 16, 2017

(65) Prior Publication Data
US 2019/0101168 A1    Apr. 4, 2019

(30) Foreign Application Priority Data

May 11, 2016  (JP) .............................. JP2016-095303
May 13, 2016  (JP) .............................. JP2016-097103
Feb. 15, 2017  (JP) .............................. JP2017-025888

(51) Int. Cl.
*F16D 3/227*    (2006.01)

(52) U.S. Cl.
CPC .......... *F16D 3/227* (2013.01); *F16D 2300/12* (2013.01); *Y10S 403/07* (2013.01); *Y10S 464/906* (2013.01); *Y10T 82/10* (2015.01)

(58) Field of Classification Search
CPC .. F16D 3/227; F16D 2300/12; Y10S 464/906; Y10S 403/07; Y10T 82/10
(Continued)

(56) References Cited

U.S. PATENT DOCUMENTS

| 3,347,293 A | * | 10/1967 | Clark | ................... B25B 23/0035 403/DIG. 7 |
| 4,215,603 A | * | 8/1980 | Jones | ......................... B23B 5/02 82/1.11 |
| 7,905,785 B2 | * | 3/2011 | Madden | ................... F16D 3/843 464/906 |

FOREIGN PATENT DOCUMENTS

| DE | 36 26 998 A1 | * | 2/1988 | ..................... 464/146 |
| JP | 2000-74084 | | 3/2000 | |

(Continued)

OTHER PUBLICATIONS

International Preliminary Report on Patentability dated Nov. 13, 2018 in International (PCT) Application No. PCT/JP2017/015743.
(Continued)

*Primary Examiner* — Greg Binda
(74) *Attorney, Agent, or Firm* — Wenderoth, Lind & Ponack, L.L.P.

(57) ABSTRACT

A plunging type constant velocity universal joint includes outer and inner joint members that transmit torque therebetween through intermediation of a ball while allowing angular displacement. The outer joint member is configured to receive an internal component comprising the ball and the inner joint member so that the internal component is slidable in an axial direction. The universal joint also includes a stopper mechanism that has an annular groove, and is configured to restrict axial displacement of the internal component by allowing the ball to interfere with a circlip fitted to the annular groove. The annular groove has a conical surface, which is inclined with respect to an axial (Continued)

direction so that the conical surface and an axial tangent line at a contact point between the ball and the circlip form a wedge angle opened from an opening end portion of the outer joint member toward a far side.

9 Claims, 23 Drawing Sheets

(58) Field of Classification Search
USPC .................................. 464/146, 167; 384/49
See application file for complete search history.

(56) References Cited

FOREIGN PATENT DOCUMENTS

| JP | 2008-190591 | 8/2008 |
| JP | 2009-180315 | 8/2009 |
| JP | 4637723 | 2/2011 |
| JP | 2011-163410 | 8/2011 |

OTHER PUBLICATIONS

International Search Report dated Jul. 4, 2017 in International (PCT) Application No. PCT/JP2017/015743.
Notice of Reasons for Refusal dated Aug. 18, 2020 in corresponding Japanese Patent Application No. 2017-025888 with English-language translation.

* cited by examiner

SLIDING-TYPE CONSTANT VELOCITY UNIVERSAL JOINT AND METHOD FOR MANUFACTURING SAME

TECHNICAL FIELD

The present invention relates to a plunging type constant velocity universal joint, which is to be used for a power transmission system of automobiles or various industrial machines, in particular, to be incorporated into a drive shaft or a propeller shaft for automobiles, and a method of manufacturing the same.

BACKGROUND ART

As a constant velocity universal joint which is to be incorporated into a drive shaft or a propeller shaft and is configured to transmit a rotational force from an engine to a wheel of an automobile at constant velocity, there has been known two types including a fixed type constant velocity universal joint and a plunging type constant velocity universal joint. The constant velocity universal joints of those types have the following structure. That is, two shafts on a driving side and a driven side are coupled to each other, and even when the two shafts form an operating angle, rotational torque is transmitted at constant velocity.

It is required that a drive shaft be adaptable to angular displacement and axial displacement caused by changes in relative positional relationship between an engine and a wheel. Therefore, the drive shaft generally has the following structure. A plunging type constant velocity universal joint is provided on an engine side (inboard side), and a fixed type constant velocity universal joint is provided on a wheel side (outboard side). The constant velocity universal joints are coupled to each other by a shaft.

As examples of the plunging type constant velocity universal joint which is to be assembled to the drive shaft, there have been known a double-offset constant velocity universal joint (DOJ) and a cross-groove constant velocity joint (LJ) in which balls are used as rolling elements configured to transmit rotational torque. Moreover, as another example of the plunging type constant velocity universal joint, there has been known a tripod type constant velocity universal joint (TJ) in which rollers are used as the rolling elements.

FIG. 19 is an illustration of an example of the double-offset constant velocity universal joint. This constant velocity universal joint includes an outer joint member 111, an inner joint member 112, a plurality of balls 113, and a cage 114.

The outer joint member 111 has linear track grooves 118 extending in an axial direction, which are formed at a plurality of positions in an inner peripheral surface 119. The inner joint member 112 has linear track grooves 120 extending in the axial direction, which are formed at a plurality of positions in an outer peripheral surface 121 and are paired with the track grooves 118 of the outer joint member 111. The balls 113 are interposed between the track grooves 118 of the outer joint member 111 and the track grooves 120 of the inner joint member 112. The cage 114 is arranged between the inner peripheral surface 119 of the outer joint member 111 and the outer peripheral surface 121 of the inner joint member 112.

This constant velocity universal joint has a structure in which an internal component 115 including the inner joint member 112, the balls 113, and the cage 114 is received in the outer joint member 111 so as to be slidable in the axial direction. This constant velocity universal joint has a structure in which one shaft end portion of a shaft 117 is inserted into and spline-fitted to a shaft hole 116 of the inner joint member 112. An inner joint member of a fixed type constant velocity universal joint is coupled to another shaft end portion (not shown) of the shaft 117 extending from the inner joint member 112 of this plunging type constant velocity universal joint, thereby forming a drive shaft.

When the drive shaft is to be assembled to a vehicle body, after the plunging type constant velocity universal joint described above is assembled to the engine side (inboard side), the fixed type constant velocity universal joint is assembled to the wheel side (outboard side). On the wheel side, a wheel bearing is assembled to the fixed type constant velocity universal joint, and then is assembled to a suspension device of the vehicle body by a knuckle.

At the time at which the plunging type constant velocity universal joint of the drive shaft is assembled to the engine side of the vehicle body, the fixed type constant velocity universal joint is not assembled to the wheel bearing on the wheel side. Therefore, in some cases, the own weight of the drive shaft including the fixed type constant velocity universal joint and the shaft is applied as a large load to the plunging type constant velocity universal joint in a slide-out direction.

Such a state may cause slide over in which the internal component 115 of the plunging type constant velocity universal joint flies out from an opening end portion 122 of the outer joint member 111. In order to prevent such slide over, a related-art plunging type constant velocity universal joint employs a stopper mechanism 125 configured to restrict the amount of axial displacement of the internal component 115 received in the outer joint member 111 (see, for example, Patent Literature 1).

CITATION LIST

Patent Literature 1: JP 4637723 B2

SUMMARY OF INVENTION

Technical Problem

The related-art plunging type constant velocity universal joint disclosed in Patent Literature 1 mentioned above employs the stopper mechanism 125 having the following configuration. That is, a recessed annular groove 123 is formed in the inner peripheral surface 119 at the opening end portion 122 of the outer joint member 111, and a circlip 124 is fitted to the annular groove 123.

In this stopper mechanism 125, when the drive shaft is to be assembled to the vehicle body, in a case in which a large load is applied to the internal component 115 in the slide-out direction, as illustrated in FIG. 20, the balls 113 of the internal component 115 interfere with the circlip 124 so that the amount of axial displacement of the balls 113 is restricted. With this action, the slide over of the internal component 115 relative to the outer joint member 111 is prevented.

The stopper mechanism 125 disclosed in Patent Literature 1 has the following structure. That is, the annular groove 123 which receives the circlip 124 fitted thereto is formed in the inner peripheral surface 119 at a large-thickness portion of the outer joint member 111 located on a far side from the opening end portion 122. With this structure, a sufficient thickness of the outer joint member 111 is secured in a part up to the opening end portion 122, and hence a sufficient strength of the annular groove 123 is secured.

However, in the case of this stopper mechanism 125, as illustrated in FIG. 21, slide end positions at which the balls 113 of the internal component 115 are brought into contact and interfere with the circlip 124 are each located at apart significantly separated apart from the opening end portion 122 of the outer joint member 111 toward the far side (see $H_0$ in FIG. 21). The axial dimension of the outer joint member 111 is increased by the amount of separation. Therefore, it is difficult to achieve reduction of a material and the weight of the outer joint member 111, with the result that it is difficult to achieve reduction in weight and size of the constant velocity universal joint.

Moreover, as illustrated in FIG. 22, the annular groove 123 which receives the circlip 124 fitted thereto has a substantially rectangular cross section formed in the inner peripheral surface 119 of the outer joint member 111. As can be seen, the annular groove 123 is formed so as to be deep (see $D_0$ in FIG. 22). Therefore, when the circlip 124 is to be assembled to the annular groove 123, the amount of radial contraction of the circlip 124 is increased, with the result that it is difficult to improve ease of operation at the time of assembly and removal of the circlip 124.

Moreover, a difference $F_0$ between an inner-diameter dimension of the circlip 124 fitted to the annular groove 123 and a circumscribed circle diameter of the balls 113 is set to be large so as to secure a sufficient amount of interference for preventing the balls 113 from getting over the circlip 124, thereby achieving a rigid stopper. Therefore, as illustrated in FIG. 23, it is required that the circlip 124 be fitted to the annular groove 123 after the internal component 115 is incorporated into the outer joint member 111. As a result, an assembling step becomes more complicated, and hence it is required that assembly be performed by a manual operation.

The annular groove 123 of the stopper mechanism 125 described above is formed by the following procedure. Specifically, for formation of the annular groove 123, first, as illustrated in FIG. 24 and FIG. 25, the opening end portion 122 of the outer joint member 111 is processed with a turning chip 129 (see the arrow in FIG. 25). Next, as illustrated in FIG. 26A, FIG. 26B, and FIG. 27, a processing surface at the opening end portion 122 of the outer joint member 111 is processed with a cutting-off tool 130 (see the arrow in FIG. 27).

As described above, the annular groove 123 having a substantially rectangular cross section is formed through the processing with the turning chip 129 and the processing with the cutting-off tool 130. Therefore, formation of the annular groove 123 requires two steps including the processing with the turning chip 129 and the processing with the cutting-off tool 130.

The present invention is proposed in view of the problems described above, and has an object to provide a plunging type constant velocity universal joint, which is reduced in weight and size and is capable of securing a sufficient strength of an annular groove in a stopper mechanism and improving ease of assembly of a stopper ring, and to provide a method of manufacturing the same.

Solution to Problem

The present invention has the following features in a plunging type constant velocity universal joint and a method of manufacturing the same. The plunging type constant velocity universal joint comprises: an outer joint member having a cup shape; and an inner joint member configured to transmit torque through intermediation of a rolling element between the outer joint member and the inner joint member while allowing angular displacement, the outer joint member being configured to receive an internal component comprising the rolling element and the inner joint member so that the internal component is slidable in an axial direction.

As a technical measure for achieving the above mentioned object, the plunging type constant velocity universal joint according to one embodiment of the present invention comprises a stopper mechanism, which has an annular groove formed in an inner peripheral surface at an opening end portion of the outer joint member, and is configured to restrict an amount of axial displacement of the internal component by allowing the rolling element to interfere with a stopper ring fitted to the annular groove, and the annular groove of the stopper mechanism has a conical surface, which is inclined with respect to an axial direction so that the conical surface and an axial tangent line at a contact point between the rolling element and the stopper ring form a wedge angle opened from the opening end portion of the outer joint member toward a far side.

According to one embodiment of the present invention, the plunging type constant velocity universal joint comprises the stopper mechanism in which the axial tangent line at the contact point between the rolling element and the stopper ring and the conical surface of the annular groove form the wedge angle opened from the opening end portion of the outer joint member toward the far side. With this, through interference of the rolling element with the stopper ring fitted to the annular groove and brought into contact with the conical surface, the amount of axial displacement of the internal component can be reliably restricted.

Moreover, with the annular groove having the conical surface forming the wedge angle as mentioned above, a slide end position at which the rolling element of the internal component is brought into contact and interfere with the stopper ring is located at a part close to the opening end portion of the outer joint member. With this, the axial dimension of the outer joint member can be reduced as compared to the related art. Therefore, reduction of the material and the weight of the outer joint member can be achieved, thereby being capable of easily reducing the weight and size of the constant velocity universal joint.

Further, with the annular groove having the conical surface forming the wedge angle as mentioned above, the annular groove which receives the stopper ring fitted thereto can be formed so as to be shallow. With this, when the stopper ring is to be assembled to the annular groove, the amount of radial contraction of the stopper ring can be set smaller than that of the related art, thereby being capable of improving ease of operation of assembly and removal of the stopper ring.

Further, with the annular groove having the conical surface forming the wedge angle as mentioned above, an outer diameter of the stopper ring can be set larger than an inner diameter of the track groove bottom of the outer joint member. With this, the amount of interference of the rolling element with the stopper ring can be set smaller than that of the related art. Therefore, the internal component can be removed from and inserted into the outer joint member through elastic deformation of the opening end portion of the outer joint member under the state in which the stopper ring is fitted to the annular groove. As a result, the assembling step can be easily simplified, and the simplification of the assembling step enables automation of the assembling step.

It is desired that the stopper mechanism in one embodiment of the present invention have a structure in which an amount of interference of the rolling element with the stopper ring is set so as to be smaller than an amount of elastic deformation of the opening end portion of the outer joint member to allow the internal component to be removed from and inserted into the outer joint member.

Through employment of such structure, the structure which enables removal and insertion of the internal component with respect to the outer joint member can be easily achieved.

It is desired that the annular groove of the stopper mechanism in one embodiment of the present invention have a structure of extending from the conical surface toward the far side of the outer joint member and having a cylindrical surface held in contact with the stopper ring. Through employment of such structure, a groove bottom inner diameter of the annular groove can be set small. With this, a sufficient strength of the annular groove in the stopper mechanism can be secured, and the removal amount in the processing of the annular groove can be reduced.

It is desired that the stopper mechanism in one embodiment of the present invention have a structure in which an axial dimension of the stopper mechanism from a contact point between the stopper ring and the cylindrical surface to a far side end surface of the annular groove is set so as to be larger than a radius of a wire member forming the stopper ring. Through employment of such structure, the stopper ring which interferes with the rolling element can be reliably held in contact with the cylindrical surface of the annular groove.

It is desired that the stopper mechanism in one embodiment of the present invention have a structure in which an axial inlet inner diameter of the annular groove of the stopper mechanism is set so as to be larger than an inner diameter of the stopper ring in a state of being fitted to the annular groove and be smaller than an inner diameter at a contact point between the stopper ring and the annular groove. Through employment of such structure, the stopper ring can be reliably retained in the annular groove, and the rolling element can be reliably allowed to interfere with the stopper ring.

It is desired that the stopper mechanism in one embodiment of the present invention have a structure in which the axial inlet inner diameter of the annular groove of the stopper mechanism is set so as to be larger than an inner diameter of the stopper ring in a state of being fitted to the annular groove throughout an entire periphery of the opening end portion of the outer joint member. Through employment of such structure, the entire periphery of the stopper ring fitted to the annular groove can be visually checked from an opening side of the outer joint member. With this, the state of assembly of the stopper ring with respect to the annular groove can be checked, and hence the stopper ring can be easily removed from the annular groove.

In a method of manufacturing a plunging type constant velocity universal joint according to one embodiment of the present invention, an annular groove which receives a stopper ring configured to allow the rolling element to interfere therewith is formed in an inner peripheral surface at an opening end portion of the outer joint member, the annular groove has a conical surface, which is inclined with respect to an axial direction so that the conical surface and an axial tangent line at a contact point between the rolling element and the stopper ring form a wedge angle opened from the opening end portion of the outer joint member toward a far side, and the conical surface is formed by only processing with a turning chip.

According to one embodiment of the present invention, the annular groove having the conical surface forming the wedge angle as mentioned above is formed by only the processing with the turning chip. Thus, the annular groove can be formed by only one step of the processing with the turning chip, thereby being capable of reducing the number of processing steps as compared to the related art.

It is desired that the annular groove in one embodiment of the present invention have a configuration in which the annular groove has a cylindrical surface, which extends from the conical surface toward the far side of the outer joint member and is held in contact with the stopper ring, and the cylindrical surface is formed by only the processing with the turning chip. With this, the annular groove formed of the conical surface and the cylindrical surface can be formed by only one step of the processing with the turning chip, thereby being capable of reducing the number of processing steps.

Advantageous Effects of Invention

According to the present invention, while a sufficient strength of the annular groove is secured, the annular groove can be formed at a part close to the opening end portion of the outer joint member. Therefore, the axial dimension of the outer joint member can be reduced. With this, reduction of the material and the weight of the outer joint member can be achieved, thereby being capable of easily reducing the weight and size of the constant velocity universal joint.

Moreover, the annular groove which receives the stopper ring fitted thereto can be formed so as to be shallow. Therefore, when the stopper ring is to be assembled to the annular groove, the amount of radial contraction of the stopper ring can be set small. With this, ease of operation of assembly and removal of the stopper ring can be improved.

Further, the annular groove which receives the stopper ring fitted thereto can be formed by only one step of the processing with the turning chip, thereby being capable of reducing the number of processing steps.

DESCRIPTION OF EMBODIMENTS

Now, a plunging type constant velocity universal joint according to an embodiment of the present invention is described in detail with reference to the drawings.

In the following embodiment, description is made of an example case in which the present invention is applied to a double-offset constant velocity universal joint (DOJ) or a cross-groove constant velocity joint (LJ) in which balls are used as rolling elements configured to transmit rotational torque. The present invention is applicable also to other plunging type constant velocity universal joints such as a tripod type constant velocity universal joint (TJ) in which rollers are used as the rolling elements.

It is required that a drive shaft configured to transmit power from an engine to a wheel of an automobile be adaptable to angular displacement and axial displacement caused by changes in relative positional relationship between the engine and the wheel. Therefore, the drive shaft generally has the following structure. A plunging type constant velocity universal joint configured to allow both the axial displacement and the angular displacement is provided on an engine side (inboard side), and a fixed type constant velocity universal joint configured to allow only the angular displacement is provided on a wheel side (outboard side). The constant velocity universal joints are coupled to each other by a shaft.

Figure 1:
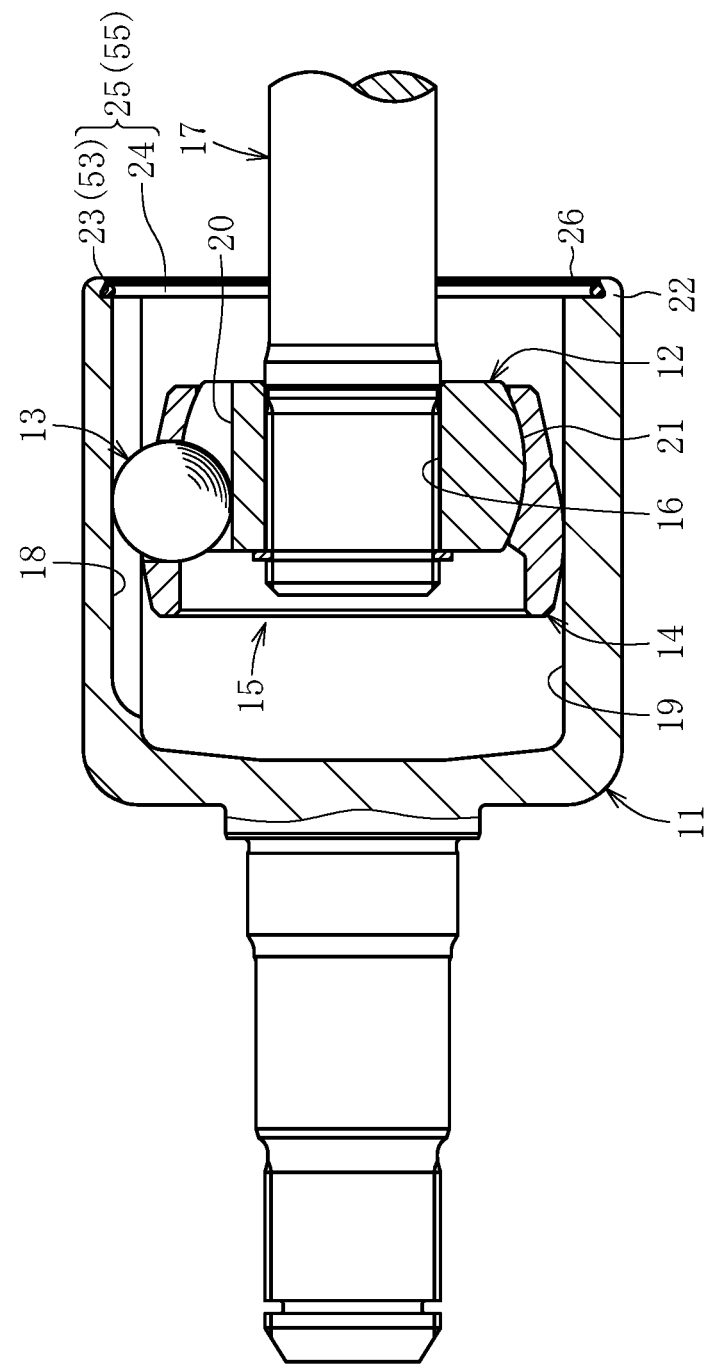
FIG. 1 is a sectional view for illustrating an overall configuration of a double-offset constant velocity universal joint according to an embodiment of the present invention.

FIG. 1 is an illustration of an overall configuration of a double-offset constant velocity universal joint (hereinafter simply referred to as "constant velocity universal joint"), which is one of the plunging type constant velocity universal joints, assembled to the drive shaft mentioned above.

The constant velocity universal joint according to the embodiment comprises an outer joint member 11 having a cup shape, an inner joint member 12, a plurality of balls 13 being rolling elements, and a cage 14. An internal component 15 comprising the inner joint member 12, the balls 13, and the cage 14 is received in the outer joint member 11 so that the internal component 15 can be axially displaced. One shaft end portion of a shaft 17 is coupled to a shaft hole 16 of the inner joint member 12 by spline-fitting. An inner joint member of a fixed type constant velocity universal joint is coupled to another shaft end portion (not shown) of the shaft 17 extending from the inner joint member 12, thereby forming the drive shaft.

The outer joint member 11 has linear track grooves 18 extending in an axial direction, which are formed at equal intervals at a plurality of positions in a circumferential direction in an inner peripheral surface 19. The inner joint member 12 has linear track grooves 20 extending in the axial direction, which are formed at equal intervals at a plurality of positions in a circumferential direction in the outer peripheral surface 21 and are paired with the track grooves 18 of the outer joint member 11. The balls 13 are arranged between the track grooves 18 of the outer joint member 11 and the track grooves 20 of the inner joint member 12 to transmit rotational torque. The cage 14 is interposed between the inner peripheral surface 19 of the outer joint member 11 and the outer peripheral surface 21 of the inner joint member 12 to retain the balls 13.

In this constant velocity universal joint, when an operating angle is formed by the shaft 17 between the outer joint member 11 and the inner joint member 12, the balls 13 retained by the cage 14 are, at any operating angles, always maintained within a bisectional plane of the operating angle, thereby keeping constant velocity between the outer joint member 11 and the inner joint member 12. Moreover, the balls 13 retained by the cage 14 roll on the track grooves 18 of the outer joint member 11 so that the internal component 15 is slidable in the axial direction with respect to the outer joint member 11.

Although illustration is omitted, in the constant velocity universal joint, in order to prevent leakage of lubricant such as grease sealed inside the joint and to prevent entry of a foreign substance from the outside of the joint, an extendable and contractable bellows boot made of resin or rubber is provided between the outer joint member 11 and the shaft 17 in a tensioned state to close an opening end portion 22 of the outer joint member 11.

When the drive shaft with the constant velocity universal joints, which have the configuration described above, assembled thereto is to be assembled to a vehicle body, in some cases, the own weight of the drive shaft comprising the fixed type constant velocity universal joint and the shaft is applied as a large load to the constant velocity universal joint in a slide-out direction. Therefore, it is required to prevent slide over in which the internal component 15 flies out from the opening end portion 22 of the outer joint member 11.

Therefore, as illustrated in FIG. 1, the constant velocity universal joint according to the embodiment employs a stopper mechanism 25 in which a recessed annular groove 23 is formed in the track grooves 18 and the inner peripheral surface 19 at the opening end portion 22 of the outer joint member 11, and a circlip 24 being a stopper ring is fitted to the annular groove 23.

Figure 2:
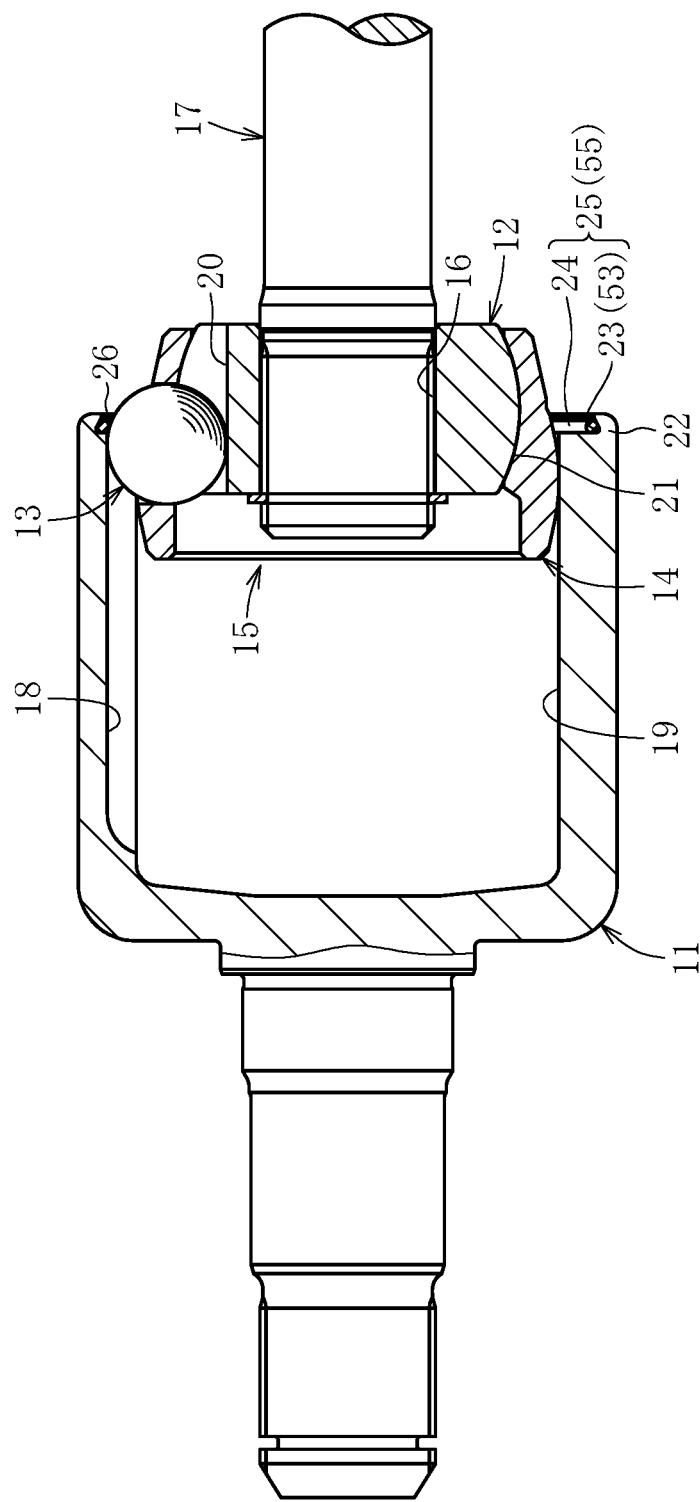
FIG. 2 is a sectional view for illustrating a state in which an internal component of FIG. 1 interferes with a stopper mechanism due to axial displacement.

In this stopper mechanism 25, when the drive shaft is to be assembled to the vehicle body, in a case in which a large load is applied to the internal component 15 in the slide-out direction, as illustrated in FIG. 2, the balls 13 of the internal component 15 interfere with the circlip 24 so that the amount of axial displacement of the balls 13 is restricted. With this, the slide over in which the internal component 15 flies out from the opening end portion 22 of the outer joint member 11 is prevented.

In particular, when the drive shaft with the constant velocity universal joint assembled thereto is to be assembled to the vehicle body, even in a case in which the own weight of the drive shaft comprising the fixed type constant velocity universal joint and the shaft is applied as a large load to the constant velocity universal joint in the slide-out direction, the balls 13 of the internal component 15 interfere with the circlip 24, thereby being capable of reliably preventing the slide over of the internal component 15. As a result, reliability in assembly of the drive shaft is improved.

The stopper mechanism 25 employed in the constant velocity universal joint according to the embodiment has the following specific configuration.

Figure 3:
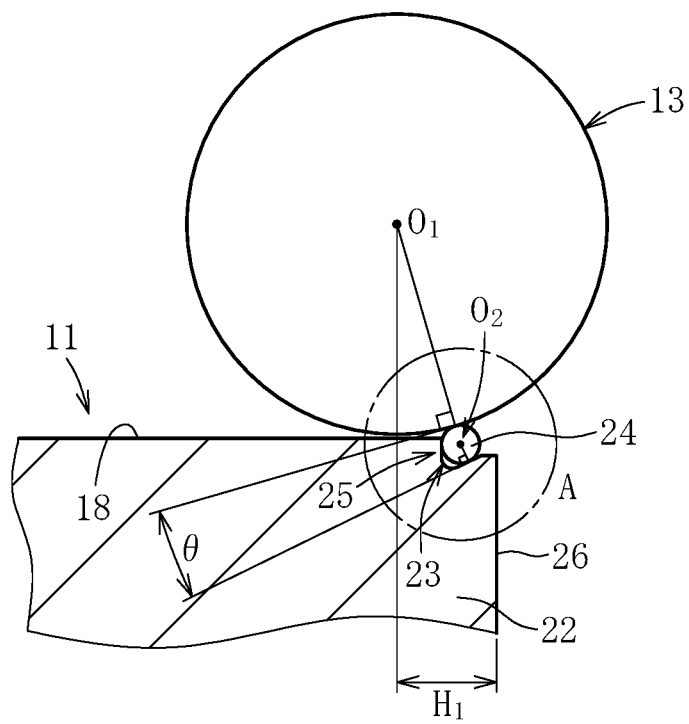
FIG. 3 is a main-part enlarged sectional view of FIG. 2.
Figure 4:
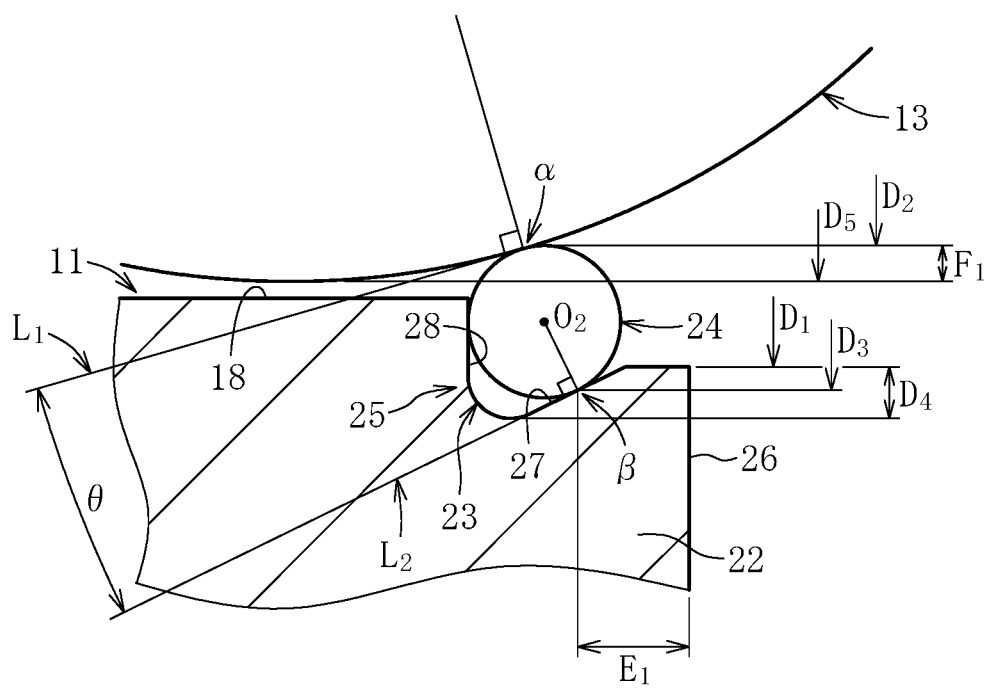
FIG. 4 is an enlarged sectional view of the portion A of FIG. 3.

As illustrated in FIG. 1 and FIG. 2, the stopper mechanism 25 in this embodiment comprises the annular groove 23 and the circlip 24. The annular groove 23 is formed in the track grooves 18 and the inner peripheral surface 19 at the opening end portion 22 of the outer joint member 11, in particular, at a part close to an opening end surface 26. The circlip 24 is fitted to the annular groove 23. FIG. 3 and FIG. 4 are each an illustration of a state in which the ball 13 is brought into contact and interferes with the circlip 24 due to axial displacement of the internal component 15.

As illustrated in FIG. 3 and FIG. 4, the annular groove 23 of the stopper mechanism 25 has a conical surface 27. The conical surface 27 is inclined with respect to the axial direction so that the conical surface 27 and an axial tangent line $L_1$ at a contact point α between the ball 13 and the circlip 24 form a wedge angle θ opened from the opening end portion 22 of the outer joint member 11 toward the far side. The conical surface 27 has a positional relationship of matching with an axial tangent line $L_2$ at a contact point β with respect to the circlip 24.

The annular groove 23 has the conical surface 27 described above and an end surface 28 which extends in a direction orthogonal to the axial direction from the track groove 18 of the outer joint member 11. The circlip 24 is retained by the annular groove 23 in a state of being held in contact with the conical surface 27 and the end surface 28 and sandwiched between the conical surface 27 and the end surface 28 in the annular groove 23.

It is preferred that the wedge angle θ be set within a range of from 5° to 25°. When the wedge angle θ is smaller than 5°, a retaining force is not sufficient. As a result, it is difficult to reliably prevent the slide over. Meanwhile, when the wedge angle θ is larger than 25°, a direction of a load applied from the circlip 24 to the annular groove 23 of the outer joint member 11 becomes closer to a slide direction. As a result, it becomes disadvantageous in terms of the groove strength, and it is difficult to reduce the weight.

In the stopper mechanism 25, an axial inlet inner diameter $D_1$ of the annular groove 23 is set so as to be larger than an inner diameter $D_2$ of the circlip 24 in the state of being fitted to the annular groove 23 and be smaller than an inner diameter $D_3$ at the contact point β between the circlip 24 and the annular groove 23. With this, the circlip 24 can be reliably retained in the annular groove 23.

In the stopper mechanism 25 having the configuration described above, in a case in which a large load is applied to the internal component 15 in the slide-out direction, the balls 13 of the internal component 15 are brought into contact and interfere with the circlip 24, thereby restricting the amount of axial displacement of the balls 13 (see FIG. 3 and FIG. 4).

In this case, the axial tangent line $L_1$ at the contact point α between the ball 13 and the circlip 24 and the axial tangent line $L_2$ at the contact point β between the circlip 24 and the conical surface 27 of the annular groove 23 form the wedge angle θ opened from the opening end portion 22 of the outer joint member 11 toward the far side. With this, through the interference of the balls 13 with the circlip 24 in the state of being retained in the annular groove 23, the amount of axial displacement of the internal component 15 can be reliably restricted.

Moreover, with the annular groove 23 having the conical surface 27 forming the wedge angle θ as mentioned above, the slide end positions at which the balls 13 of the internal component 15 are brought into contact and interfere with the circlip 24 are each located at a part close to the opening end portion 22 of the outer joint member 11.

Figure 21:
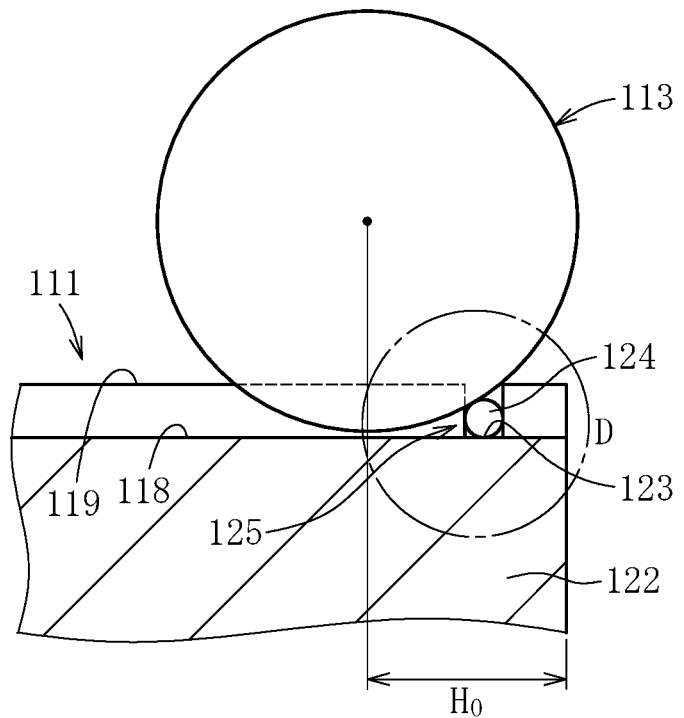
FIG. 21 is a main-part enlarged sectional view of FIG. 20.

That is, as illustrated in FIG. 3, an axial dimension $H_1$ between a center $O_1$ of the ball 13 and the opening end surface 26 of the outer joint member 11 is smaller than that given in the case of the related-art constant velocity universal joint (see FIG. 21) ($H_1 < H_0$). With this, the axial dimension of the outer joint member 11 can be reduced as compared to the related art, and reduction of a material and the weight of the outer joint member 11 can be achieved, thereby being capable of easily achieving reduction in weight and size of the constant velocity universal joint.

As described above, with the wedge angle θ of the conical surface 27 of the annular groove 23, a force of removal which acts from the circlip 24 on the conical surface 27 of the annular groove 23 becomes larger in a direction oriented radially outward than in the axial direction of the outer joint member 11 and acts from a center $O_2$ of the circlip 24 toward the contact point β with the conical surface 27. Therefore, even when the annular groove 23 is formed at a part close to the opening end portion 22 of the outer joint member 11 as mentioned above, a sufficient strength of the annular groove 23 can be secured.

Figure 22:
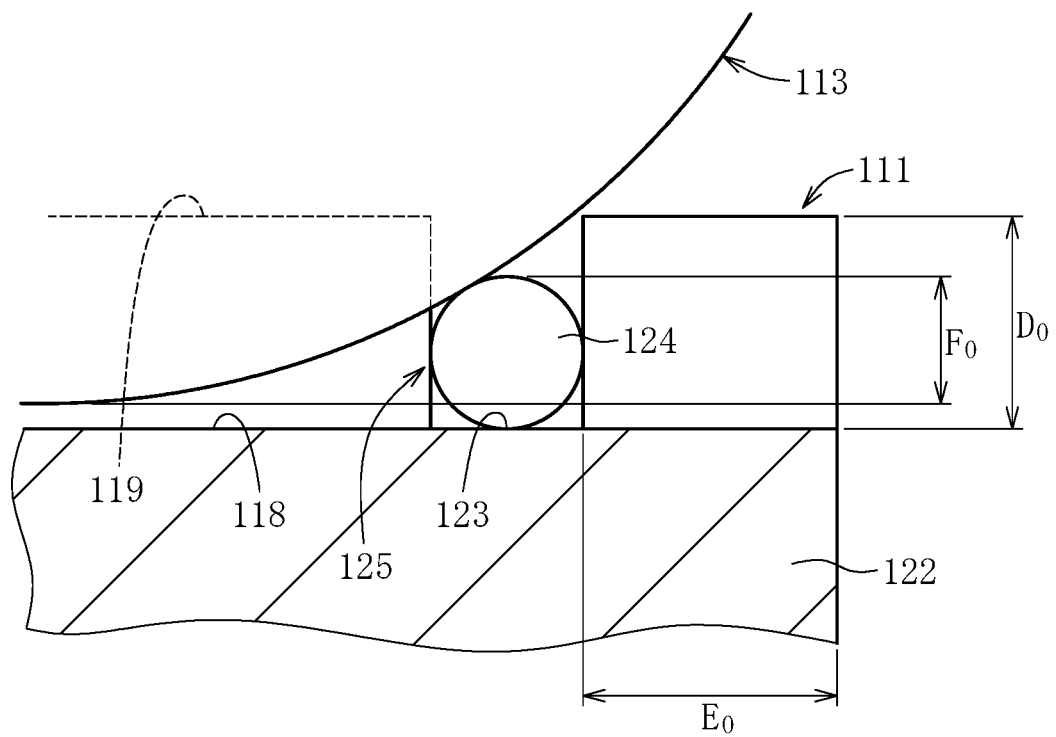
FIG. 22 is an enlarged sectional view of the portion D of FIG. 21.
Figure 23:
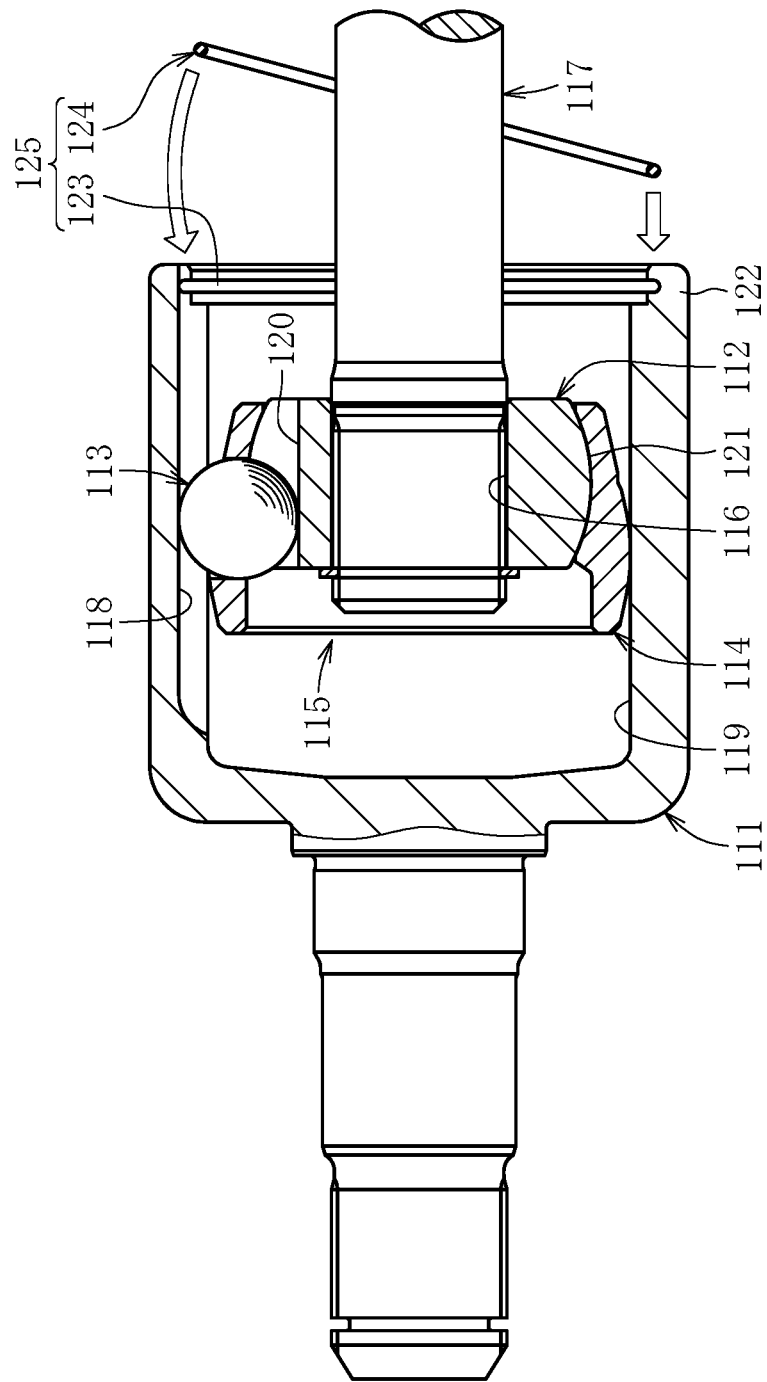
FIG. 23 is a sectional view for illustrating a state in which the internal component and a stopper ring are assembled to an outer joint member of FIG. 19.
Figure 24:
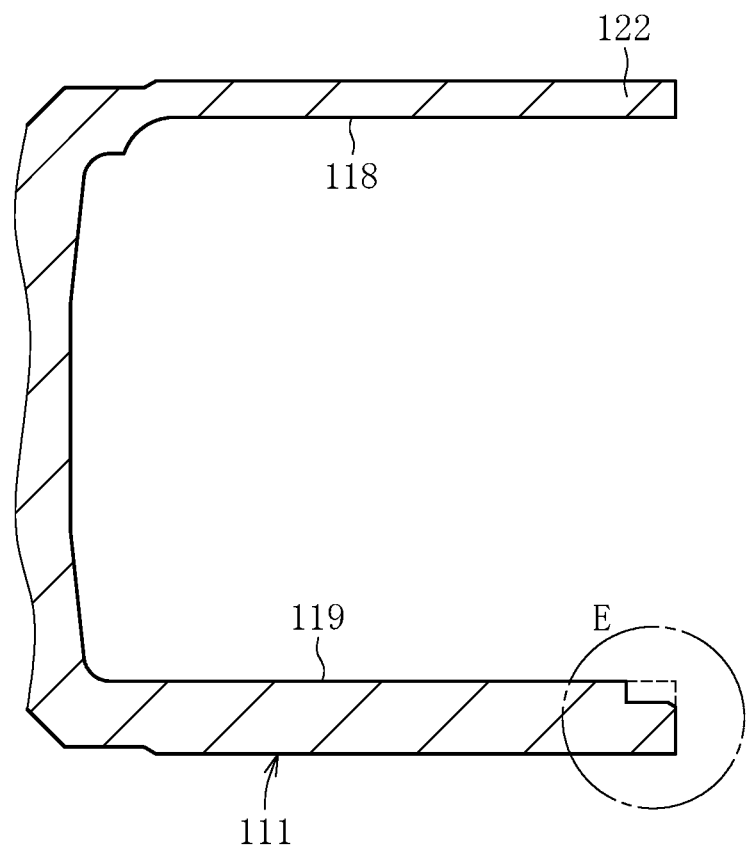
FIG. 24 is a sectional view for illustrating a state before an annular groove is formed in the outer joint member of FIG. 19.
Figure 25:
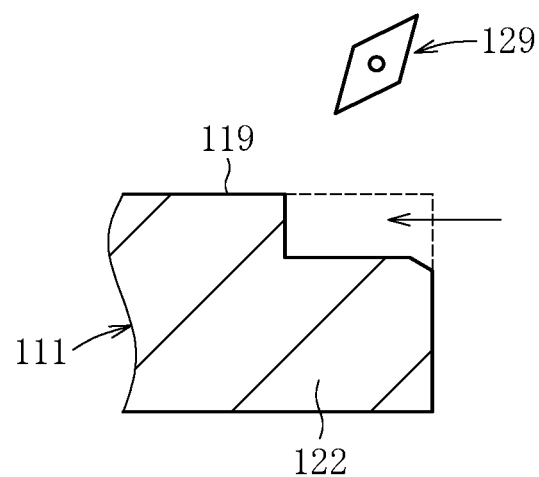
FIG. 25 is an enlarged sectional view of the portion E of FIG. 24.
Figure 26B:
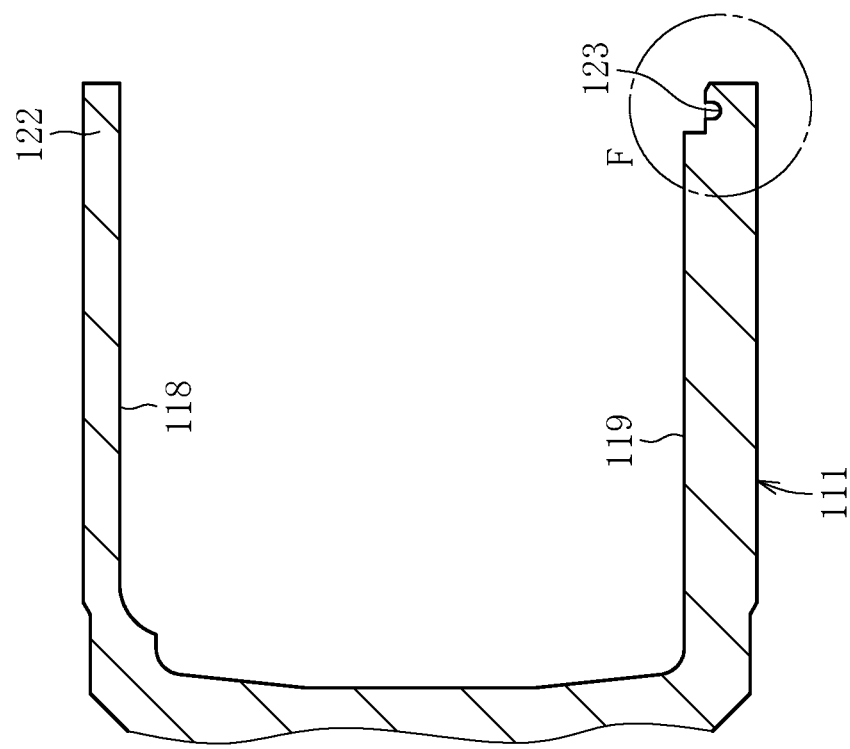
FIG. 26B is an illustration of the annular groove formed in the outer joint member of FIG. 19, and is a sectional view taken along the line R-R of FIG. 26A.
Figure 26A:
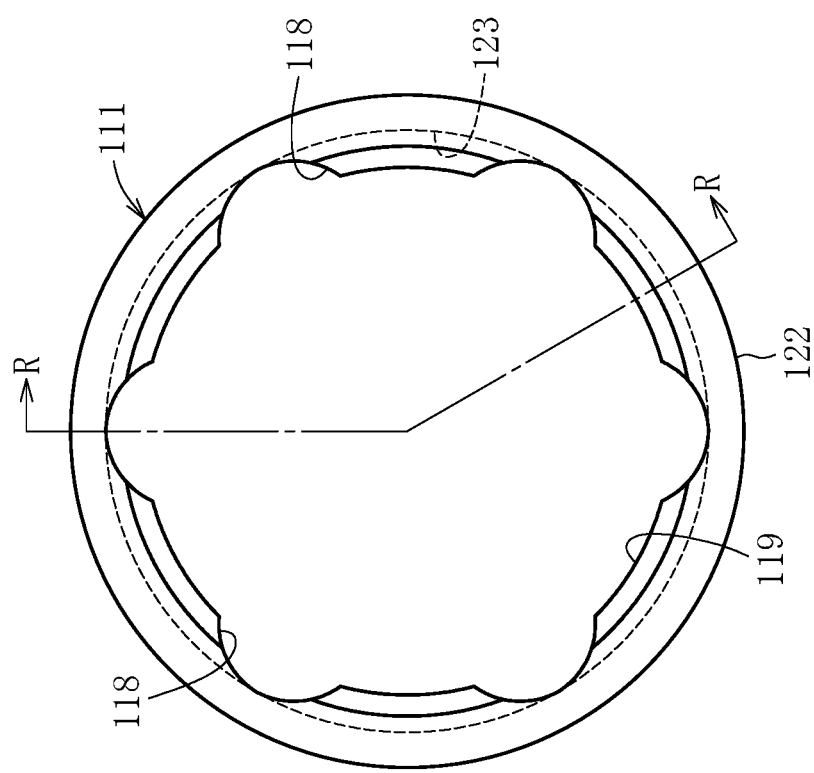
FIG. 26A is an illustration of the annular groove formed in the outer joint member of FIG. 19, and is a side view of the outer joint member as seen from an opening side of the outer joint member.
Figure 27:
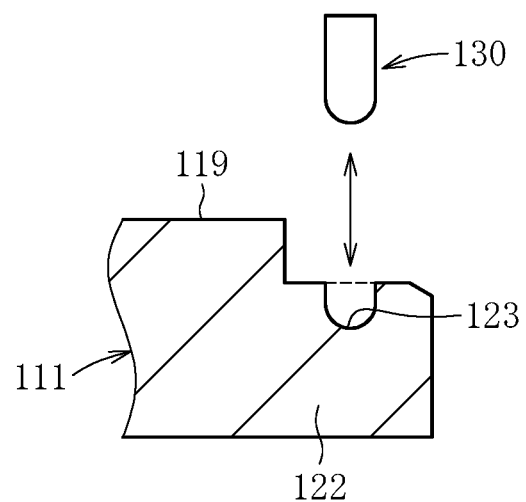
FIG. 27 is an enlarged sectional view of the portion F of FIG. 26B.

As a result, an axial dimension $E_1$ from the contact point β between the circlip 24 and the conical surface 27 to the opening end surface 26 of the outer joint member 11 can be set smaller than that given in the case of the related-art constant velocity universal joint (see FIG. 22) ($E_1 < E_0$). Also on this point, the axial dimension of the outer joint member 11 can be reduced, and reduction of the material and the weight of the outer joint member 11 can be achieved, thereby contributing to the reduction in weight and size of the constant velocity universal joint.

Further, with the annular groove 23 having the conical surface 27 forming the wedge angle θ as mentioned above, as illustrated in FIG. 4, the annular groove 23 which receives the circlip 24 fitted thereto can be formed so as to be shallower than that of an annular groove in the related art (see FIG. 22) ($D_4 < D_0$). With this, when the circlip 24 is to be assembled to the annular groove 23, the amount of radial contraction of the circlip 24 can be set smaller than that of the related art, thereby being capable of improving ease of operation of assembly and removal of the circlip 24. Moreover, a difference $F_1$ between the inner diameter $D_2$ of the circlip 24 and a circumscribed circle diameter $D_5$ of the balls 13 is smaller than that given in the case of the related-art constant velocity universal joint (see FIG. 22) ($F_1 < F_0$).

As a result, the internal component 15 can be removed from and inserted into the outer joint member 11 through elastic deformation of the opening end portion 22 of the outer joint member 11 under the state in which the circlip 24 is fitted to the annular groove 23. That is, the amount of elastic deformation of the outer joint member 11 is larger on the opening end portion side than on the far side, and hence the opening end portion 22 of the outer joint member 11 can be easily elastically deformed. Moreover, the annular groove 23 which receives the circlip 24 fitted thereto is formed at a part close to the opening end surface 26.

As described above, through setting of the amount of interference of the balls 13 with the circlip 24, that is, the difference $F_1$ between the inner diameter $D_2$ of the circlip 24 and the circumscribed circle diameter $D_5$ of the balls 13 to be smaller than the amount of elastic deformation of the opening end portion 22 of the outer joint member 11, the internal component 15 can be removed from and inserted into the outer joint member 11.

Figure 5:
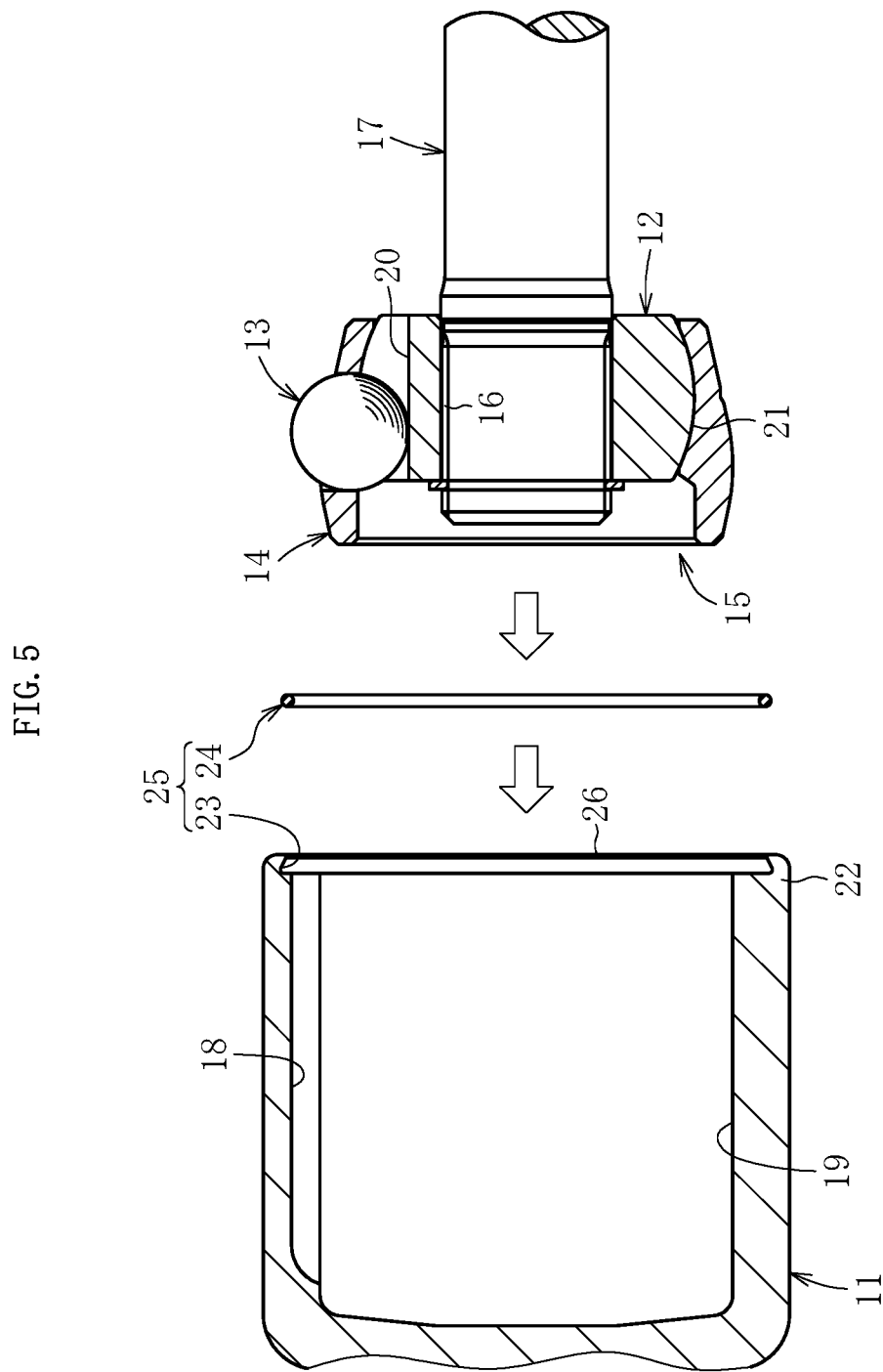
FIG. 5 is a sectional view for illustrating a state in which a stopper ring and the internal component are assembled to an outer joint member of FIG. 1.

Thus, as illustrated in FIG. 5, first, the circlip 24 is assembled to the outer joint member 11. After that, the internal component 15 is assembled to the outer joint member 11. Through radial expansion of the opening end portion 22 of the outer joint member 11 within a region of elastic deformation, the balls 13 of the internal component 15 can get over the circlip 24 with a minimum required force of removal. As a result, the internal component 15 can be received in the outer joint member 11.

With this, after the assembly, removal of the internal component 15 from the outer joint member 11 can also be performed under the state in which the circlip 24 is mounted to the annular groove 23. In such a manner, the assembling step of the circlip 24 and the internal component 15 can be easily simplified, and the simplification of the assembling step enables automation of the assembling step.

Figure 6:
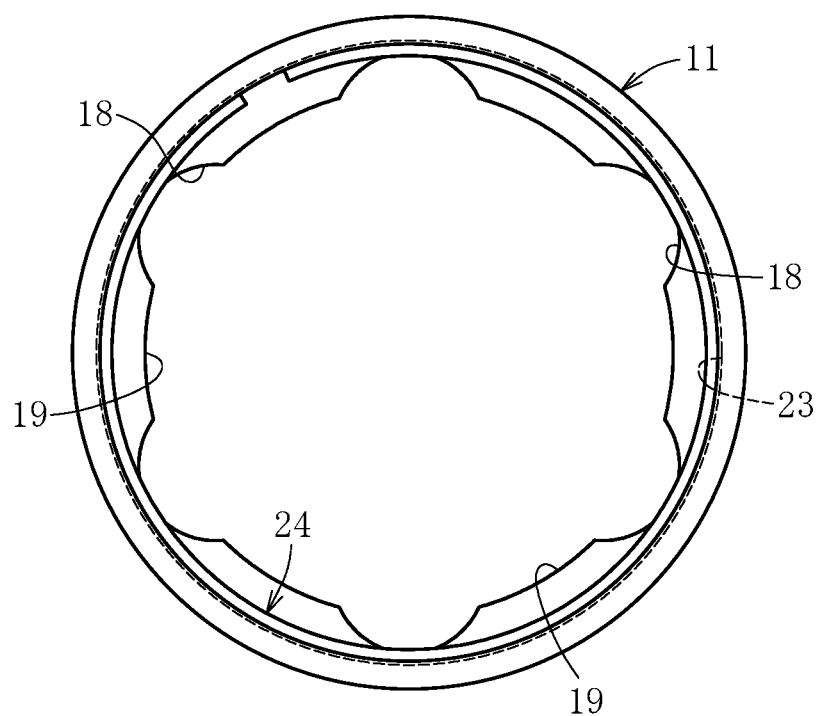
FIG. 6 is a side view of the outer joint member of FIG. 1 as seen from an opening side of the outer joint member.

In the stopper mechanism 25 in this embodiment, as illustrated in FIG. 3 and FIG. 4, the axial inlet inner diameter $D_1$ of the annular groove 23 is set so as to be larger than the inner diameter $D_2$ of the circlip 24 in the state of being inserted into the annular groove 23 throughout the entire periphery of the opening end portion 22 of the outer joint member 11. In FIG. 6, only the circlip 24 fitted to the annular groove 23 of the outer joint member 11 is illustrated, and illustration of the internal component 15 is omitted.

With this, as illustrated in FIG. 6, the entire periphery of the circlip 24 in the state of being fitted to the annular groove 23 can be visually checked from the opening side of the outer joint member 11. As a result, the state of assembly of the circlip 24 to the annular groove 23 can be checked. Moreover, the amount of radial contraction of the circlip 24 is small, and hence the circlip 24 can be easily removed from the annular groove 23.

The annular groove 23 of the stopper mechanism 25 described in the embodiment above can be formed by the following procedure. That is, as illustrated in FIG. 7A, FIG. 7B, and FIG. 8, the annular groove 23 can be achieved through processing on the opening end portion 22 of the outer joint member 11 with a turning chip 29 (see the arrow in FIG. 8).

As described above, the annular groove 23 having the conical surface 27 forming the wedge angle θ as mentioned above is formed by only the processing with the turning chip 29. Thus, the annular groove 23 can be formed by only one step of the processing with the turning chip 29, thereby being capable of reducing the number of processing steps as compared to the related art.

Figure 7A:
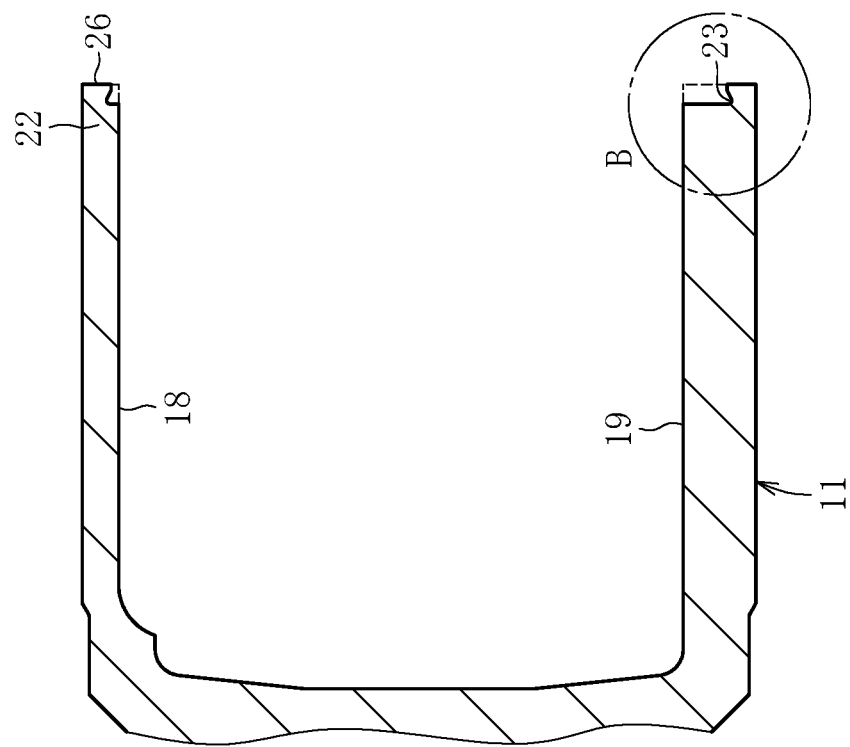
FIG. 7A is an illustration of an annular groove formed in the outer joint member of FIG. 1, and is a side view of the outer joint member as seen from the opening side of the outer joint member.
Figure 7B:
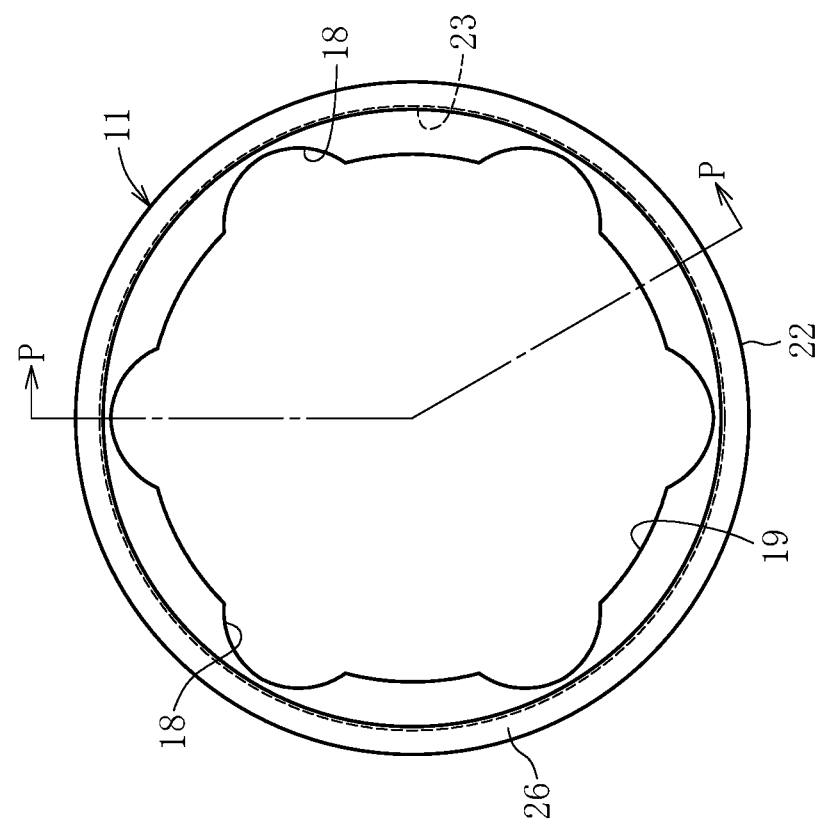
FIG. 7B is an illustration of the annular groove formed in the outer joint member of FIG. 1, and is a sectional view taken along the line P-P of FIG. 7A.
Figure 8:
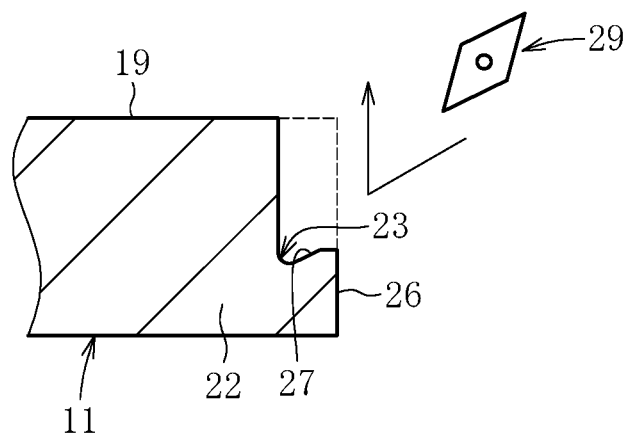
FIG. 8 is an enlarged sectional view of the portion B of FIG. 7B.
Figure 9B:
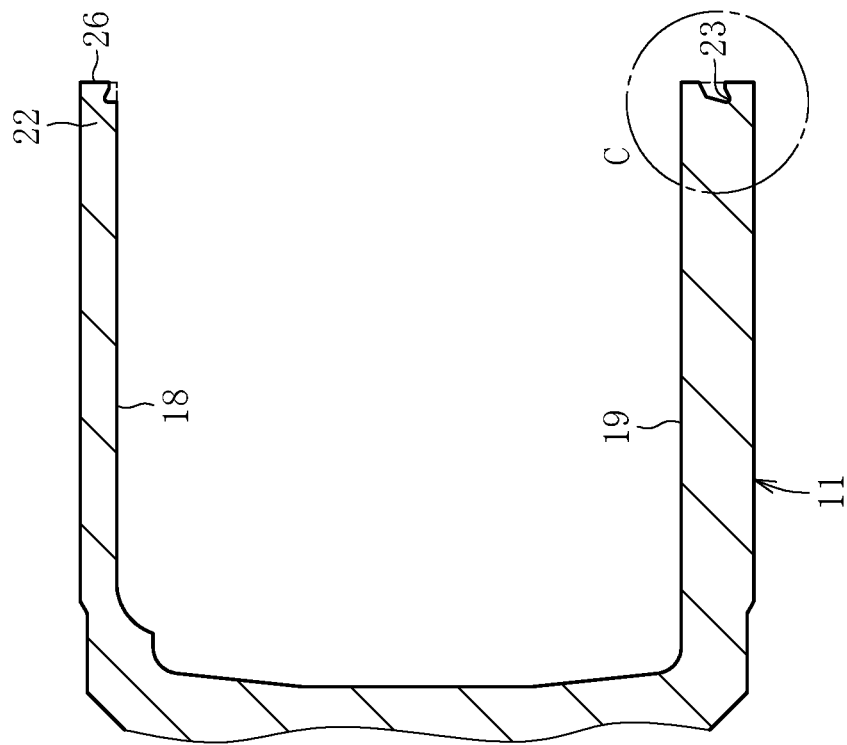
FIG. 9B is an illustration of another example of the annular groove formed in the outer joint member, and is a sectional view taken along the line Q-Q of FIG. 9A.
Figure 9A:
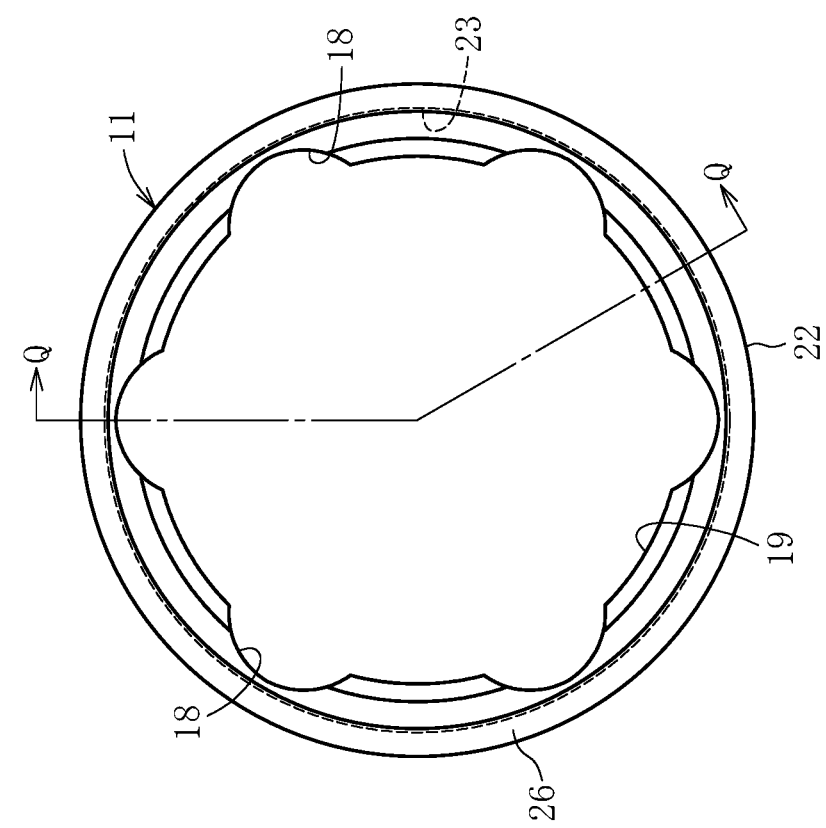
FIG. 9A is an illustration of another example of the annular groove formed in the outer joint member, and is a side view of the outer joint member as seen from the opening side of the outer joint member.
Figure 10:
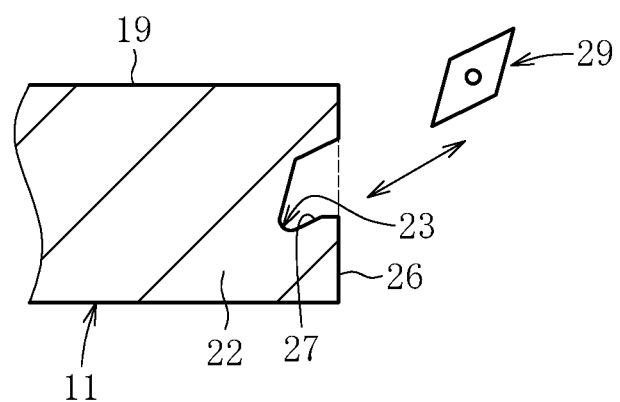
FIG. 10 is an enlarged sectional view of the portion C of FIG. 9B.

In the processing with the turning chip 29 illustrated in FIG. 7A, FIG. 7B, and FIG. 8, the opening end portion 22 of the outer joint member 11 is subjected to turning with the turning chip 29 to the inner peripheral surface 19 of the outer joint member 11 (see the arrow in FIG. 8). However, as illustrated in FIG. 9A, FIG. 9B, and FIG. 10, the opening end portion 22 of the outer joint member 11 may be subjected to the turning with the turning chip 29 only at the opening end surface 26 rather than turning to the inner peripheral surface 19 of the outer joint member 11 (see the arrow in FIG. 10).

Figure 11:
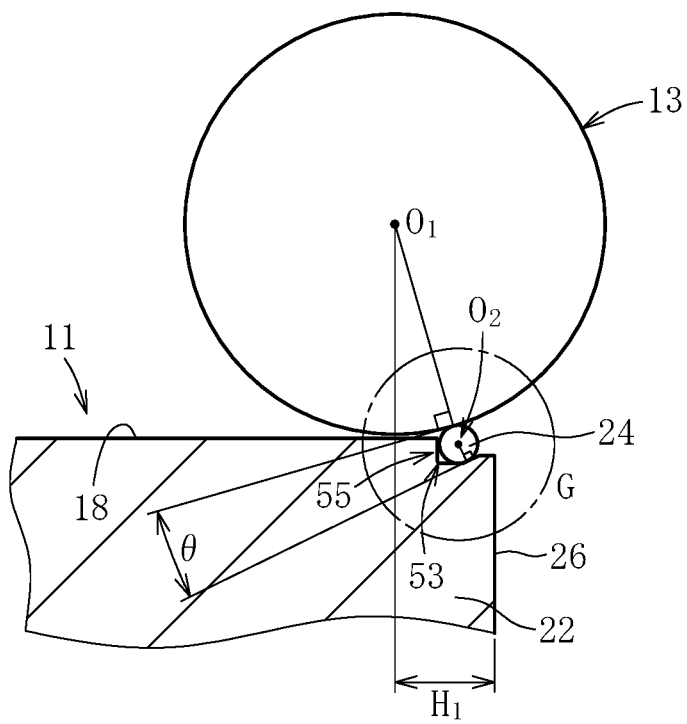
FIG. 11 is a main-part enlarged sectional view for illustrating a state in which an internal component interferes with a stopper mechanism due to axial displacement in another embodiment of the present invention.
Figure 12:
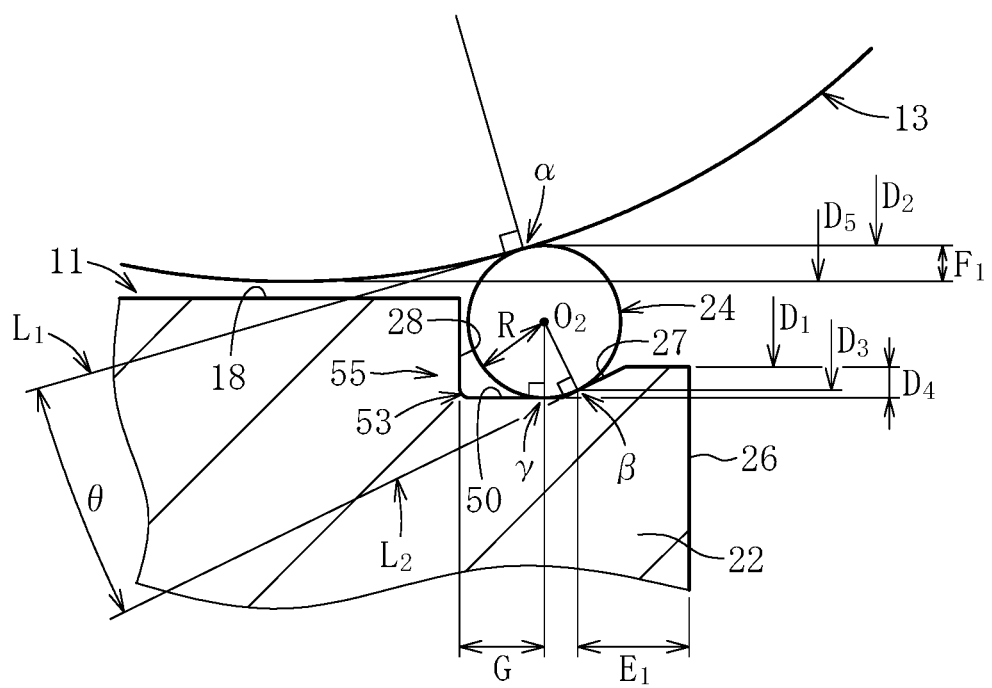
FIG. 12 is an enlarged sectional view of the portion G of FIG. 11.

With regard to the stopper mechanism 25 in the embodiment described above (see FIG. 3 and FIG. 4), illustration is given of the example case in which the annular groove 23 is formed of only the conical surface 27. However, a stopper mechanism 55 as illustrated in FIG. 11 and FIG. 12 may be employed. Among components illustrated in FIG. 11 and FIG. 12, components which are the same as or correspond to the components illustrated in FIG. 3 and FIG. 4 are denoted by the same reference symbols, and redundant description thereof is omitted.

An annular groove 53 of the stopper mechanism 55 illustrated in FIG. 11 and FIG. 12 comprises the conical surface 27 described above and a cylindrical surface 50. The cylindrical surface 50 extends from the conical surface 27 toward the far side of the outer joint member 11, and is held in contact with the circlip 24. The circlip 24 is retained by the annular groove 53 in a state of being held in contact with the conical surface 27 and the cylindrical surface 50 in the annular groove 53.

The annular groove 53 in this embodiment has the cylindrical surface 50 in addition to the conical surface 27. Therefore, a groove bottom inner diameter of the annular groove 53 can be set smaller than that given in the case in which only the conical surface 27 is formed (see FIG. 4). That is, a thickness of the outer joint member 11 at the opening end portion 22 can be set large. Therefore, a sufficient strength of the annular groove 53 in the stopper mechanism 55 can be secured, and the removal amount in the processing of the annular groove 53 can be reduced.

Moreover, in the stopper mechanism 55 in this embodiment, an axial dimension G from a contact point γ between the circlip 24 and the cylindrical surface 50 toward the far side end surface 28 of the annular groove 53 is set so as to be larger than a radius R of a wire member forming the circlip 24. With this, the circlip 24 which interferes with the balls 13 can be reliably held in contact with the cylindrical surface 50 of the annular groove 53.

Configurations other than the cylindrical surface 50 of the annular groove 53 of the stopper mechanism 55 in this embodiment as well as actions and effects thereof are the same as those of the stopper mechanism 25 in the embodiment illustrated in FIG. 3 and FIG. 4, and hence redundant description is omitted.

The annular groove 53 of the stopper mechanism 55 described in the embodiment above can be formed by the following procedure. That is, as illustrated in FIG. 13A, FIG. 13B, and FIG. 14, the annular groove 53 can be achieved through processing on the opening end portion 22 of the outer joint member 11 with the turning chip 29 (see the arrow in FIG. 14).

As described above, the annular groove 53 having the conical surface 27 and the cylindrical surface 50 forming the wedge angle θ as mentioned above is formed by only the processing with the turning chip 29. Thus, the annular groove 53 can be formed by only one step of the processing with the turning chip 29, thereby being capable of reducing the number of processing steps as compared to the related art.

Figure 13A:
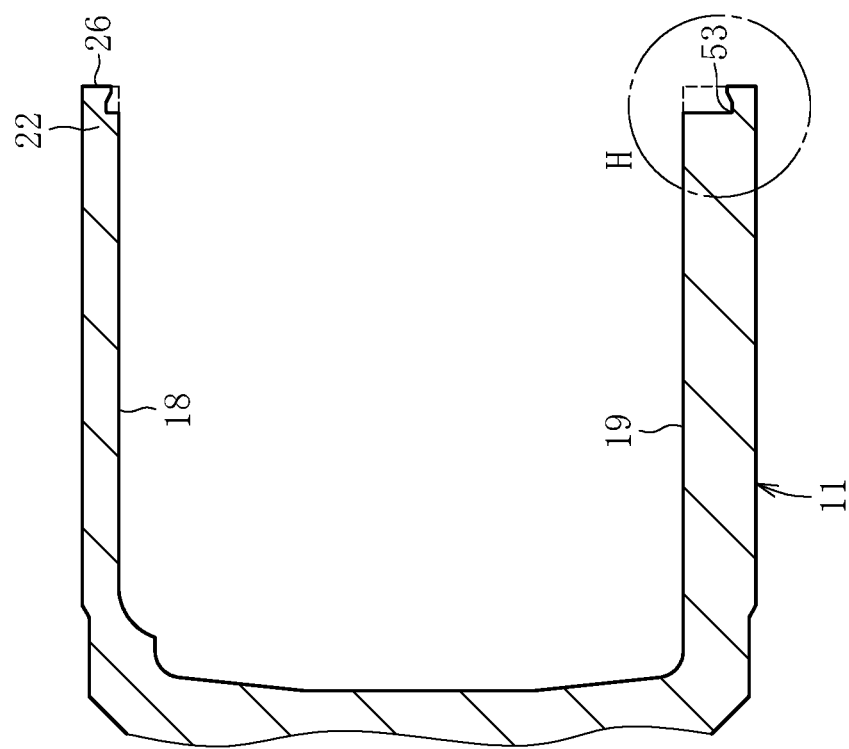
FIG. 13A is an illustration of an annular groove formed in an outer joint member of FIG. 11, and is a side view of the outer joint member as seen from an opening side of the outer joint member.
Figure 13B:
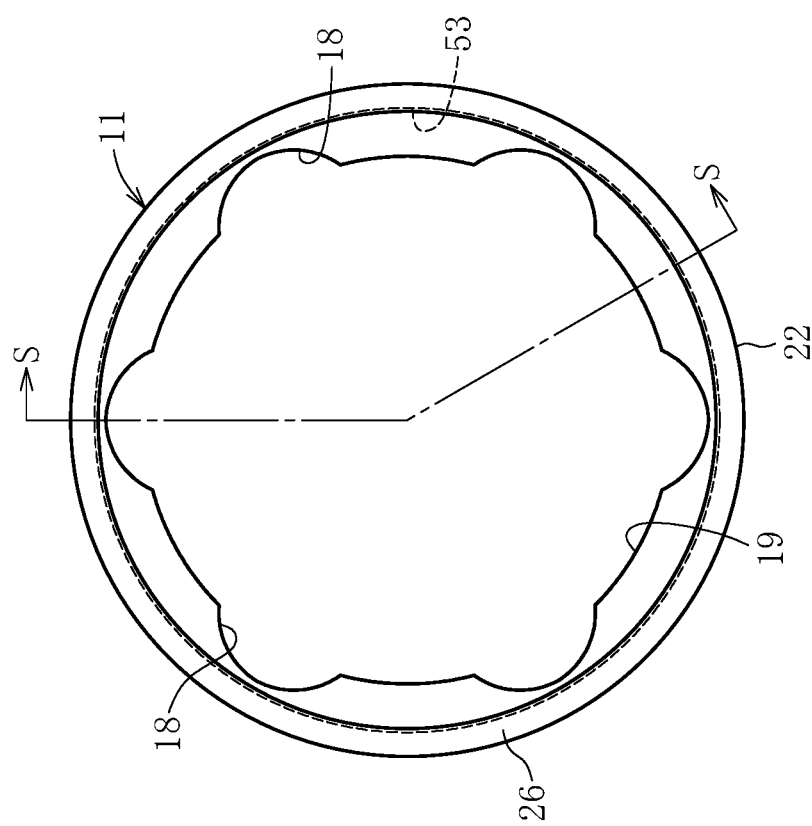
FIG. 13B is an illustration of the annular groove formed in the outer joint member, and is a sectional view taken along the line S-S of FIG. 13A.
Figure 14:
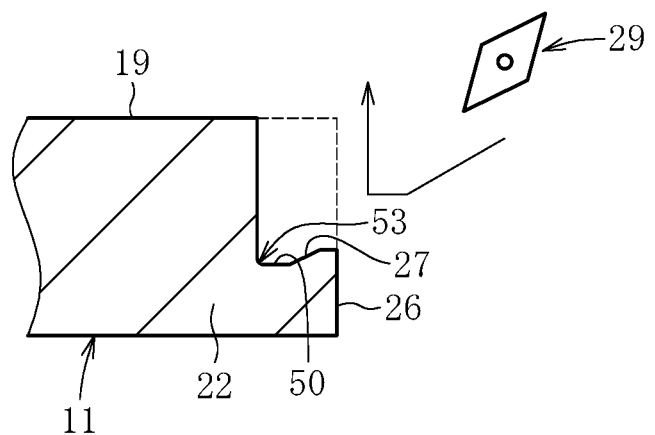
FIG. 14 is an enlarged sectional view of the portion H of FIG. 13B.
Figure 15A:
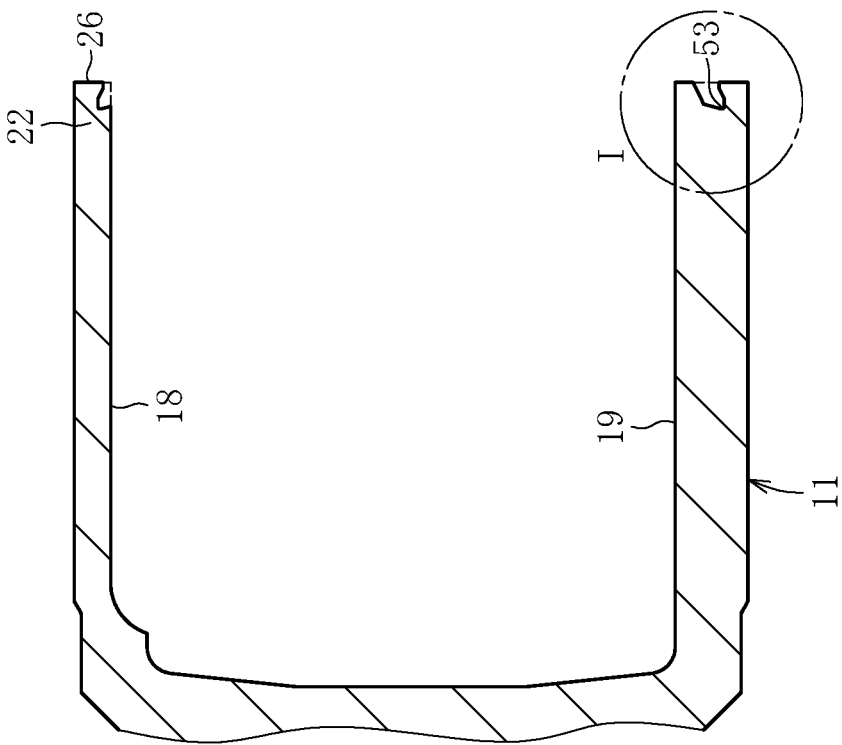
FIG. 15A is an illustration of another example of the annular groove formed in the outer joint member, and is a side view of the outer joint member as seen from the opening side of the outer joint member.
Figure 15B:
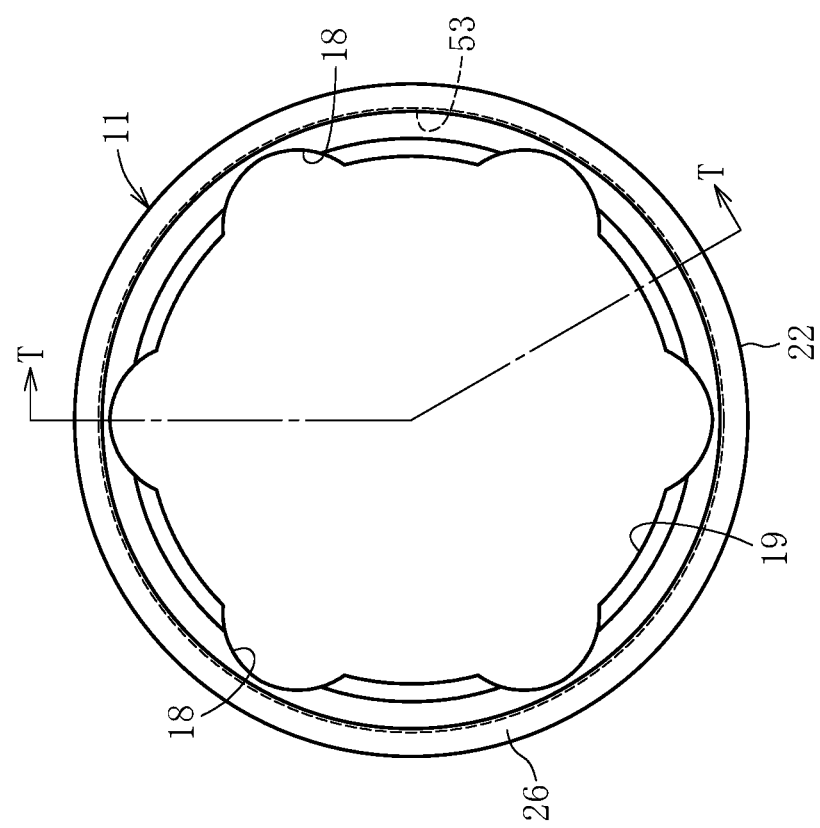
FIG. 15B is an illustration of another example of the annular groove formed in the outer joint member, and is a sectional view taken along the line T-T of FIG. 15A.
Figure 16:
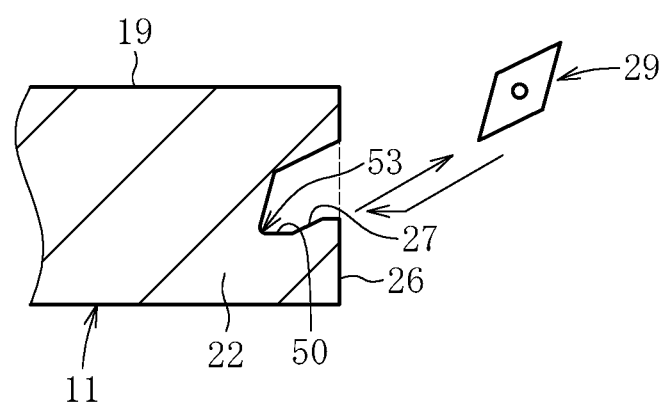
FIG. 16 is an enlarged sectional view of the portion I of FIG. 15B.

In the processing with the turning chip 29 illustrated in FIG. 13A, FIG. 13B, and FIG. 14, the opening end portion 22 of the outer joint member 11 is subjected to turning with the turning chip 29 to the inner peripheral surface 19 of the outer joint member 11 to form the annular groove 53 (see the arrow in FIG. 14). However, as illustrated in FIG. 15A, FIG. 15B, and FIG. 16, the opening end portion 22 of the outer joint member 11 may be subjected to the turning with the turning chip 29 only at the opening end surface 26 rather than turning to the inner peripheral surface 19 of the outer joint member 11 to form the annular groove 53 (see the arrow in FIG. 16).

In the embodiment above (see FIG. 1 and FIG. 2), illustration is given of the example case in which the present invention is applied to the double-offset constant velocity universal joint being one of ball types. However, as in the embodiment illustrated in FIG. 17 and FIG. 18, the present invention is applicable also to a cross-groove constant velocity joint of another ball type.

Figure 17:
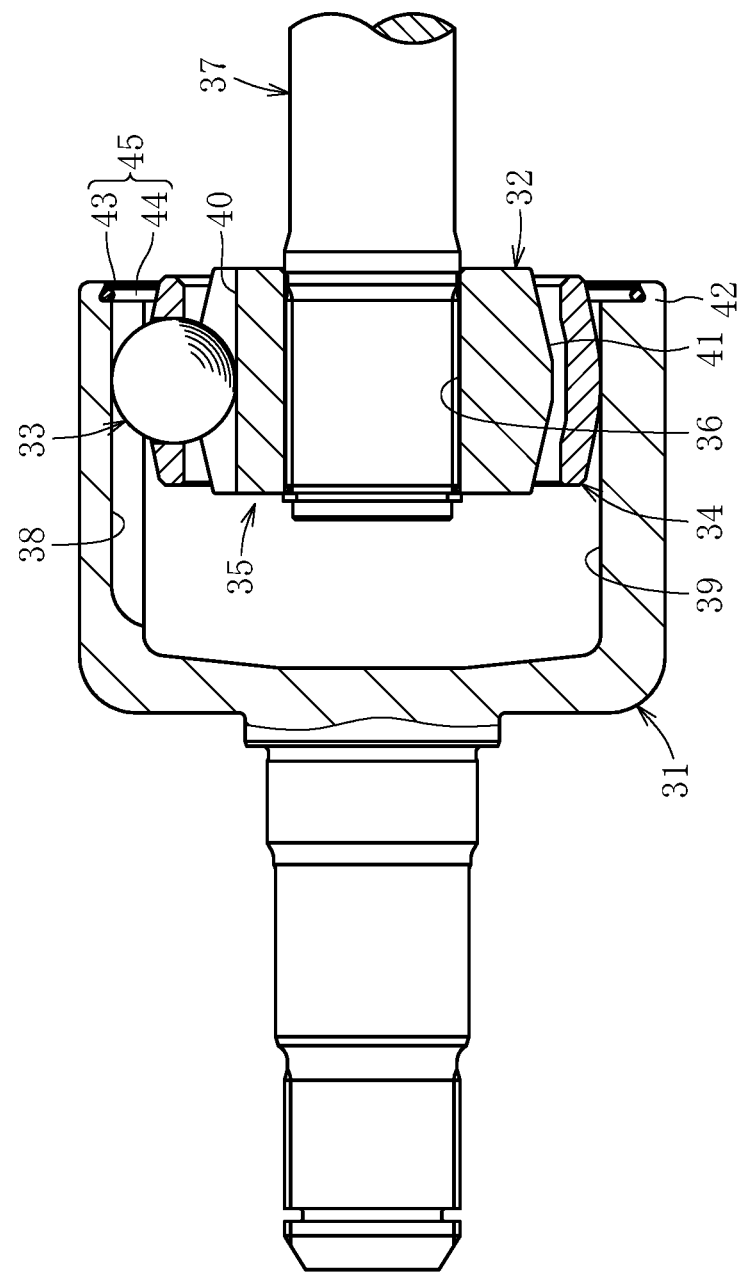
FIG. 17 is a sectional view for illustrating an overall configuration of a cross-groove constant velocity joint according to another embodiment of the present invention.

As illustrated in FIG. 17, this constant velocity universal joint comprises an outer joint member 31 having a cup shape, an inner joint member 32, a plurality of balls 33 being rolling elements, and a cage 34. An internal component 35 comprising the inner joint member 32, the balls 33, and the cage 34 is received in the outer joint member 31 so that the internal component 35 can be axially displaced. A shaft end portion of a shaft 37 is coupled to a shaft hole 36 of the inner joint member 32 by spline-fitting.

The outer joint member 31 has linear track grooves 38 extending in the axial direction, which are formed at equal intervals at a plurality of positions in a circumferential direction in the inner peripheral surface 39 under a state in which the linear track grooves 38 are inclined alternately in reverse directions with respect to the axis line. The inner joint member 32 has linear track grooves 40 extending in the axial direction, which are formed at equal intervals at a plurality of positions in a circumferential direction in the outer peripheral surface 41 under a state in which the track grooves 40 are inclined in opposite directions with respect to the track grooves 38 of the outer joint member 31.

The balls 33 are incorporated in an intersecting portion between the track grooves 38 of the outer joint member 31 and the track grooves 40 of the inner joint member 32 to transmit rotational torque. The cage 34 is interposed between the inner peripheral surface 39 of the outer joint member 31 and the outer peripheral surface 41 of the inner joint member 32 to retain the balls 33.

Also in the constant velocity universal joint according to this embodiment, as illustrated in FIG. 17, the stopper mechanism 45 comprising the recessed annular groove 43, which is formed in the track grooves 38 and the inner peripheral surface 39 at the opening end portion 42 of the outer joint member 31, and the circlip 44 fitted to the annular groove 43 is applicable.

Figure 18:
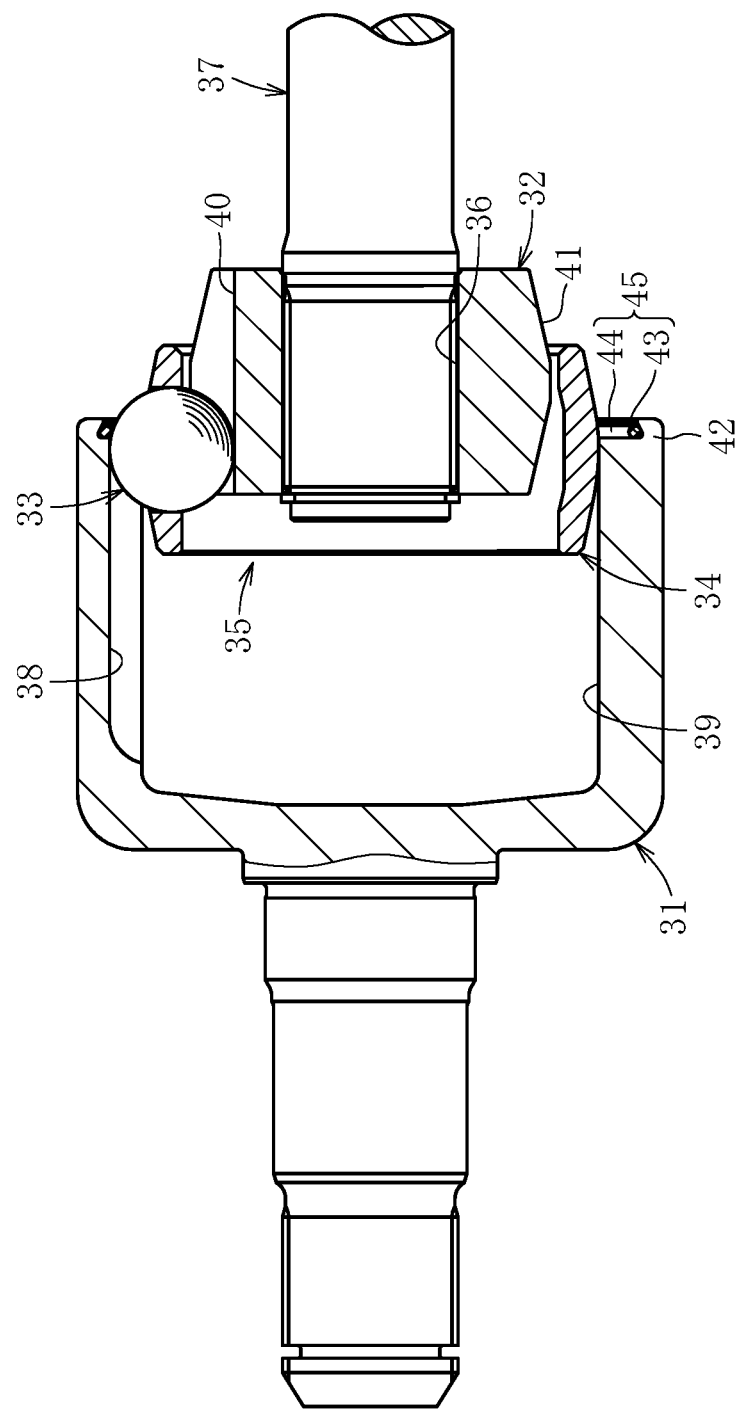
FIG. 18 is a sectional view for illustrating a state in which an internal component of FIG. 17 interferes with a stopper mechanism due to axial displacement.
Figure 19:
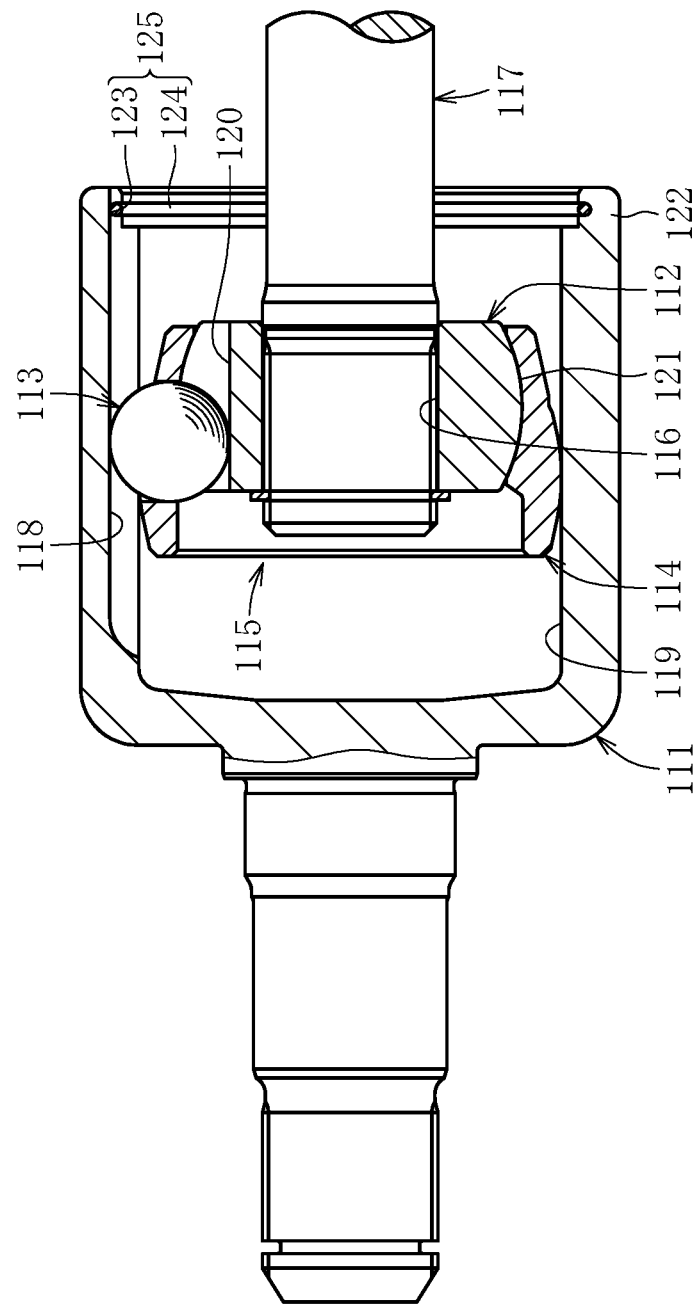
FIG. 19 is a sectional view for illustrating an overall configuration of a related-art plunging type constant velocity universal joint.
Figure 20:
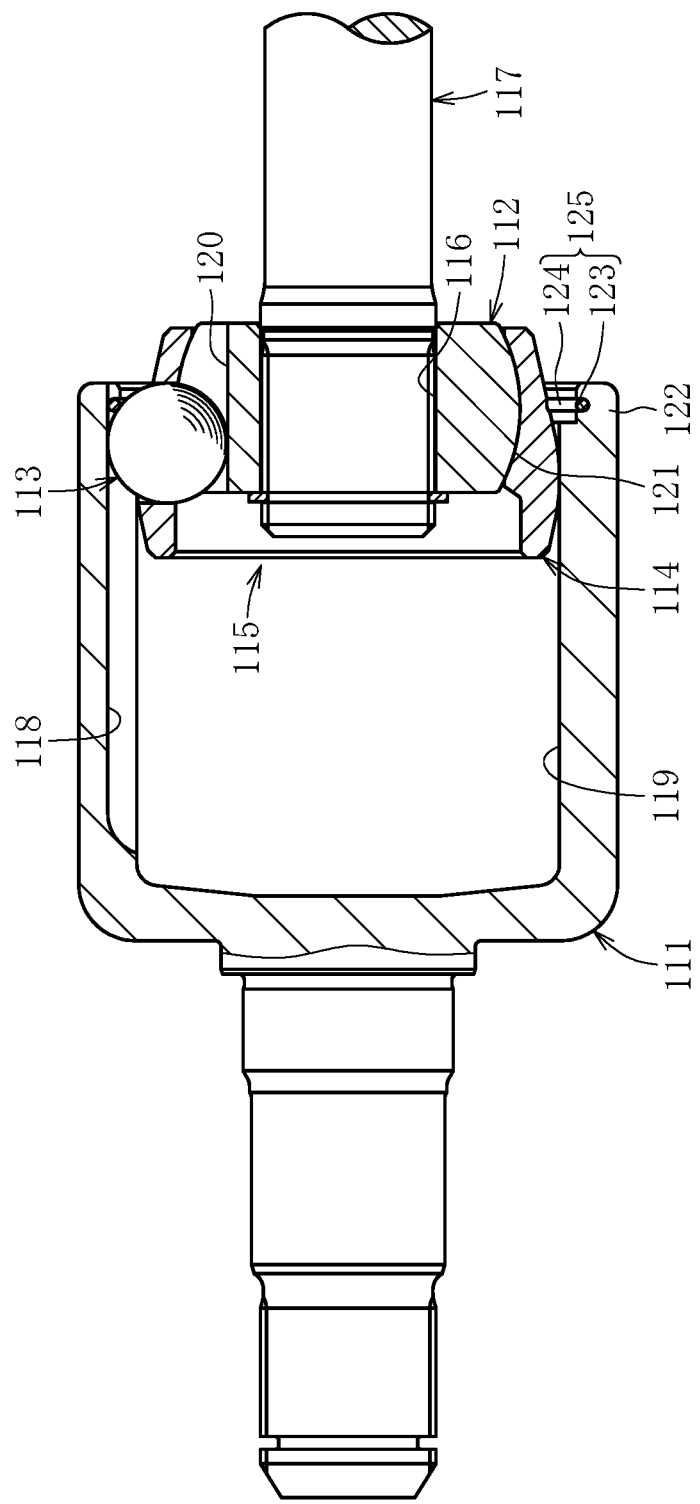
FIG. 20 is a sectional view for illustrating a state in which an internal component of FIG. 19 interferes with a stopper mechanism due to axial displacement.

Also in this stopper mechanism 45, in a case in which a large load is applied to the internal component 35 in the slide-out direction, as illustrated in FIG. 18, the balls 33 of the internal component 35 interfere with the circlip 44 so that the amount of axial displacement of the balls 33 is restricted. With this, the slide over in which the internal component 35 flies out from the opening end portion 42 of the outer joint member 31 is prevented.

The stopper mechanism 45 has the same configuration as well as actions and effects which are the same as those of the stopper mechanisms 25 and 55 in the constant velocity universal joint illustrated in FIG. 1 and FIG. 2, and hence redundant description thereof is omitted.

The present invention is not limited to the above-mentioned embodiments. As a matter of course, the present invention may be carried out in various modes without departing from the spirit of the present invention. The scope of the present invention is defined in claims, and encompasses equivalents described in claims and all changes within the scope of claims.

The invention claimed is:

1. A plunging type constant velocity universal joint, comprising:
   an outer joint member having a cup shape;
   an inner joint member configured to transmit torque through intermediation of a rolling element between the outer joint member and the inner joint member while allowing angular displacement,
   the outer joint member being configured to receive an internal component comprising the rolling element and the inner joint member so that the internal component is slidable in an axial direction; and
   a stopper mechanism, which has an annular groove formed in an inner peripheral surface at an opening end portion of the outer joint member, and is configured to restrict an amount of axial displacement of the internal component by allowing the rolling element to interfere with a stopper ring fitted to the annular groove,
   wherein the annular groove of the stopper mechanism has a conical surface, which is inclined with respect to the axial direction so that the conical surface and an axial tangent line at a contact point between the rolling element and the stopper ring form a wedge angle opened from the opening end portion of the outer joint member toward a far side, and
   wherein the stopper ring is sandwiched between the rolling element and the conical surface of the annular groove so that the axial displacement of the rolling element is restricted.

2. The plunging type constant velocity universal joint according to claim 1, wherein the annular groove of the stopper mechanism extends from the conical surface toward the far side of the outer joint member and has a cylindrical surface held in contact with the stopper ring.

3. The plunging type constant velocity universal joint according to claim 1, wherein an axial dimension of the stopper mechanism from a contact point between the stopper ring and a cylindrical surface of the annular groove to a far side end surface of the annular groove is set so as to be larger than a radius of a wire member forming the stopper ring.

4. The plunging type constant velocity universal joint according to claim 1, wherein the internal component is allowed to be removed from and inserted into the outer joint member through elastic deformation of the opening end portion of the outer joint member under a state in which the stopper ring is fitted to the annular groove.

5. The plunging type constant velocity universal joint according to claim 1, wherein the stopper mechanism has a structure in which an amount of interference of the rolling element with the stopper ring is set so as to be smaller than an amount of elastic deformation of the opening end portion of the outer joint member to allow the internal component to be removed from and inserted into the outer joint member.

6. The plunging type constant velocity universal joint according to claim 1, wherein an axial inlet inner diameter of the annular groove of the stopper mechanism is set so as to be larger than an inner diameter of the stopper ring in a state of being fitted to the annular groove and be smaller than an inner diameter at a contact point between the stopper ring and the annular groove.

7. The plunging type constant velocity universal joint according to claim 1, wherein an axial inlet inner diameter of the annular groove of the stopper mechanism is set so as to be larger than an inner diameter of the stopper ring in a state of being fitted to the annular groove throughout an entire periphery of the opening end portion of the outer joint member.

8. A method of manufacturing a plunging type constant velocity universal joint, the plunging type constant velocity universal joint comprising:
  an outer joint member having a cup shape; and
  an inner joint member configured to transmit torque through intermediation of a rolling element between the outer joint member and the inner joint member while allowing angular displacement,
    the outer joint member being configured to receive an internal component comprising the rolling element and the inner joint member so that the internal component is slidable in an axial direction,
  wherein an annular groove which receives a stopper ring configured to allow the rolling element to interfere therewith is formed in an inner peripheral surface at an opening end portion of the outer joint member,
  wherein the annular groove has a conical surface, which is inclined with respect to the axial direction so that the conical surface and an axial tangent line at a contact point between the rolling element and the stopper ring form a wedge angle opened from the opening end portion of the outer joint member toward a far side, and
  wherein the stopper ring is sandwiched between the rolling element and the conical surface of the annular groove so that the axial displacement of the rolling element is restricted,
  the method comprising forming the conical surface by only processing with a turning chip.

9. The method of manufacturing a plunging type constant velocity universal joint according to claim 8, wherein the annular groove has a cylindrical surface, which extends from the conical surface toward the far side of the outer joint member and is held in contact with the stopper ring, and the forming comprises forming the cylindrical surface by only the processing with the turning chip.

* * * * *